US010641093B2

(12) United States Patent
Okada et al.

(10) Patent No.: US 10,641,093 B2
(45) Date of Patent: May 5, 2020

(54) TUNNEL BORING MACHINE

(71) Applicant: HITACHI ZOSEN CORPORATION, Osaka (JP)

(72) Inventors: Toshiyuki Okada, Osaka (JP); Takayuki Iwamuro, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 38 days.

(21) Appl. No.: 15/542,186

(22) PCT Filed: Dec. 1, 2015

(86) PCT No.: PCT/JP2015/083786
§ 371 (c)(1),
(2) Date: Jul. 7, 2017

(87) PCT Pub. No.: WO2016/114026
PCT Pub. Date: Jul. 21, 2016

(65) Prior Publication Data
US 2018/0258765 A1 Sep. 13, 2018

(30) Foreign Application Priority Data
Jan. 13, 2015 (JP) .................... 2015-004294

(51) Int. Cl.
| *E21D 9/11* | (2006.01) |
| *E21D 9/093* | (2006.01) |
| *E21D 9/08* | (2006.01) |
| *E21D 9/10* | (2006.01) |

(Continued)

(52) U.S. Cl.
CPC ............ *E21D 9/112* (2013.01); *E21D 9/0879* (2016.01); *E21D 9/093* (2016.01); *E21D 9/1093* (2013.01); *E21D 9/11* (2013.01); *G01L 1/22* (2013.01); *G01L 5/12* (2013.01)

(58) Field of Classification Search
CPC ...................................................... E21D 9/003
See application file for complete search history.

(56) References Cited

U.S. PATENT DOCUMENTS

| 4,079,795 A | 3/1978 | Sackmann et al. |
| 9,957,796 B2 * | 5/2018 | Okada ........................ E21D 9/11 |

(Continued)

FOREIGN PATENT DOCUMENTS

| DE | 202012103593 U1 | 11/2012 |
| JP | 57-052236 Y | 11/1982 |
| JP | 61-152097 U | 9/1986 |

(Continued)

OTHER PUBLICATIONS

Machine translation of JP 62-211492A 2019.*

(Continued)

*Primary Examiner* — Janine M Kreck
(74) *Attorney, Agent, or Firm* — Pillsbury Winthrop Shaw Pittman, LLP

(57) ABSTRACT

A tunnel boring machine includes: a cutter head; a cutter support; a cutter driving unit; a rotational position sensing unit; a strain sensor; and a data processing unit configured to calculate a force acting on the cutter head in association with the position of the cutter head in the rotational direction, based on sensing results of the strain sensor and the rotational position sensing unit.

16 Claims, 14 Drawing Sheets

(51) Int. Cl.
*G01L 1/22* (2006.01)
*G01L 5/12* (2006.01)

(56) References Cited

U.S. PATENT DOCUMENTS

| | | |
|---|---|---|
| 2008/0024000 A1 | 1/2008 | Moulin et al. |
| 2013/0125662 A1* | 5/2013 | Kunimi ................ E21D 9/003 73/784 |

FOREIGN PATENT DOCUMENTS

| | | |
|---|---|---|
| JP | 62-211492 A | 9/1987 |
| JP | 62-211494 A | 9/1987 |
| JP | 02-203228 A | 8/1990 |
| JP | 2738897 B2 | 4/1998 |
| JP | 11-101091 A | 4/1999 |
| JP | 2002-004772 A | 1/2002 |
| JP | 2003-307095 A | 10/2003 |
| JP | 2009-221802 * | 1/2009 |
| JP | 2009-221802 A | 10/2009 |
| JP | 2011-196068 A | 10/2011 |

OTHER PUBLICATIONS

Written Opinion and Search Report issued in corresponding Singapore Application No. 11201705709P dated Aug. 17, 2018.
International Search Report PCT/JP2015/083786 dated Feb. 23, 2016 with English translation.
Notification of Reasons for Refusal dated Jan. 29, 2019 issued in corresponding Japanese Patent Application No. 2015-004294 with English translation.

* cited by examiner

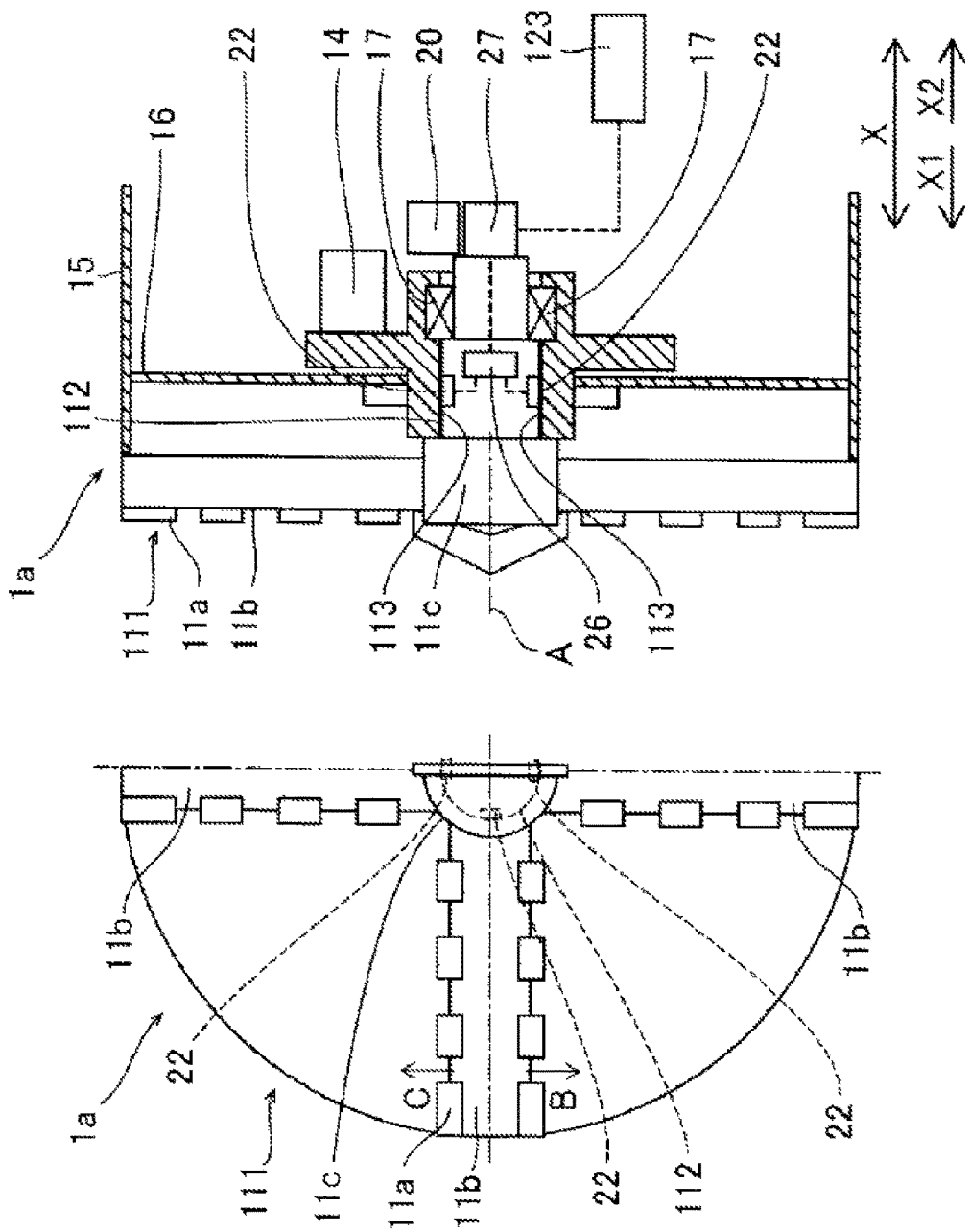

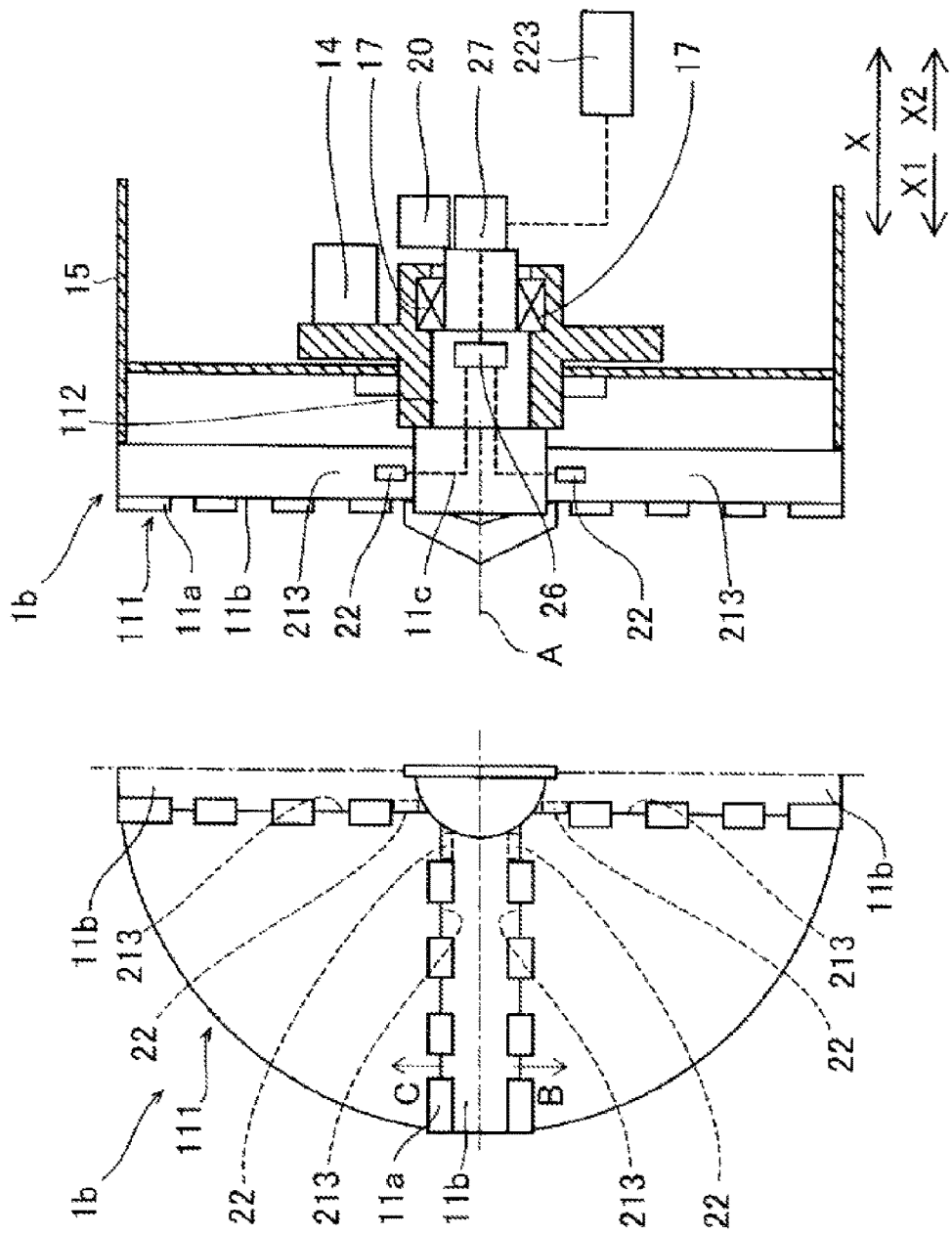

TUNNEL BORING MACHINE

CROSS-REFERENCE TO RELATED APPLICATIONS

This application is the U.S. National Stage of PCT/JP2015/083786, filed Dec. 1, 2015, which claims priority to Japanese Patent Application No. JP 2015-004294, filed Jan. 13, 2015. The contents of these applications are incorporated herein by reference in entirety.

TECHNICAL FIELD

The present invention relates to a tunnel boring machine, and in particular to a tunnel boring machine having a cutter head.

BACKGROUND

There have been conventionally known tunnel boring machines having a cutter head. An example of such tunnel boring machines is disclosed in Japanese Patent No. 2738897.

The tunnel boring machine disclosed in Japanese Patent No. 2738897 includes a cutter head, an intermediate beam that supports the cutter head, and a cutter driving unit for rotationally drive the cutter head and the intermediate beam. The tunnel boring machine advances forward by a thrust force of a thrust jack, while rotating the cutter head by the cutter driving unit.

Prior to boring using a tunnel boring machine, a boring investigation can be performed to roughly grasp the geology of the boring route. However, it is difficult to accurately grasp the presence of unexpected buried objects and the change of strata in advance. Therefore, boring is advanced while monitoring the cutter torque (the rotational torque of the cutter driving unit), a jack thrust (a thrust force of the thrust jack), boring speed and the like.

In boring, the tunnel boring machine may advance while straddling different strata or encounter buried objects or stones. In such cases, the cutter head may be subjected to an eccentric load (deviation of forces acting on the cutter head). The eccentric load may cause damage to the cutter head and the cutter driving unit and abnormal wear of cutter bits (boring edges).

RELEVANT REFERENCES

List of Relevant Patent Literature

Patent Literature 1: Japanese Patent No. 2738897

SUMMARY

However, when it is attempted to estimate the distribution of the forces acting on the cutter head from the conventional jack thrust force or the like, it is impossible to accurately estimate the resistance between the body of the tunnel boring machine and the natural ground, and the thrust force of the thrust jack has less tendency to reflect the eccentric load acting on the cutter head because the body of the tunnel boring machine is supported by the natural ground, and it is thus difficult to accurately estimate the distribution of forces. Therefore, there has been a problem that the distribution of the forces acting on the cutter head cannot be sensed accurately.

The present invention is intended to overcome the above problem, and one object thereof is to provide a tunnel boring machine that can accurately sense the distribution of the forces acting on the cutter head.

To achieve the above object, a tunnel boring machine according to one aspect of the present invention comprises: a cutter head; a cutter support supporting the cutter head and configured to rotate with the cutter head; a cutter driving unit configured to rotationally drive the cutter head and the cutter support; a rotational position sensing unit configured to sense a position of the cutter head in a rotational direction; at least one strain sensor provided in the cutter head or the cutter support; and a data processing unit configured to calculate a force acting on the cutter head in association with the position of the cutter head in the rotational direction, based on sensing results of the at least one strain sensor and the rotational position sensing unit.

In the tunnel boring machine according to one aspect of the present invention, as described above, the strain sensor may be provided on the cutter head or the cutter support. Therefore, the forces actually acting on the cutter head can be sensed more directly and accurately from the strain occurring in the cutter head or the cutter support, as compared to the case where the forces acting on the cutter head are estimated from the jack thrust force and the like. In addition, the tunnel boring machine includes the rotational position sensing unit for sensing the position of the cutter head in the rotational direction, and the data processing device for calculating the forces acting on the cutter head in association with the position of the cutter head in the rotational direction, based on the sensing results of the strain sensors and the rotational position sensing unit. Therefore, the forces acting on the cutter head obtained from the strain sensor can be obtained as the rotational direction distribution over, for example, one rotation (360°) of the cutter head. With these arrangements, the present invention enables accurately sensing the distribution of forces acting on the cutter head. As a result, it can be determined from the obtained distribution of the forces whether the cutter head is subjected to an eccentric load and at what position in the rotational direction the eccentric load has occurred. Thus, it may be possible to grasp early the change of strata and the presence and the position of a buried object, and it can be prevented that the cutter head and the cutter driving unit are damaged and the cutter bits are worn abnormally due to the change of strata and the presence of a buried object.

In the tunnel boring machine according to one aspect, it is more preferable that the data processing device is configured to obtain the rotational direction distribution of the forces acting on the cutter head in the direction of the rotation axis based on the sensing results of the strain sensor and the rotational position sensing unit. With this arrangement, it may be possible to obtain the distribution of the forces acting on the cutter head in the direction of the rotation axis, the forces being produced as reaction forces against the thrust force for boring. As a result, it may be possible to grasp a sudden change of strata in front of the tunnel boring machine boring forward or an encounter with an buried object based on whether an eccentric load is present in the distribution of the forces in the direction of the rotational axis, and it may be possible to grasp the location of the change of the strata and the position of the buried object with respect to a boring surface. Further, it may be possible to grasp occurrence of local loads on the bearing and the seal portions of the cutter head, for example, the case where a large load has occurred locally while the whole (the average) of the loads is within an allowable range in the distribution of the forces in the direction of the rotation axis. Ability to grasp these conditions may help to prevent troubles in boring a tunnel.

In the tunnel boring machine according to one aspect, it is more preferable that the at least one strain sensor comprises three or more strain sensors arranged in the cutter head or the cutter support at regular angular intervals. With this arrangement, the distribution of the forces for one rotation of the cutter head can be obtained with a smaller rotation angle. For example, when three strain sensors are provided at intervals of 120°, the distribution of the forces for one rotation can be obtained with a one-third rotation. Therefore, occurrence of an eccentric load to the cutter head can be detected early. Since there are three or more strain sensors, it may be possible to grasp the distribution of the forces acting on the cutter head to some degree even when the cutter head is stopped. This may help to grasp the conditions when the tunnel boring machine is stopped.

In the tunnel boring machine according to one aspect, it is more preferable that the tunnel boring machine further comprises a temperature sensor provided near the sensor, and the data processing device is configured to perform temperature compensation on the sensing results of the strain sensors based on the temperatures near the strain sensor sensed by the temperature sensor. With this arrangement, it may be possible to eliminate, by temperature compensation, the effect of temperature change in the cutter head due to the boring heat produced in boring. As a result, the distribution of the forces acting on the cutter head can be sensed more accurately.

In the above arrangement in which the data processing unit calculates the rotational direction distribution of the forces acting on the cutter head in the direction of the rotation axis, it is more preferable that the strain sensor is mounted to installation surfaces of the cutter head or the cutter support, the installation surfaces extending substantially in parallel with the rotation axis of the cutter head. With this arrangement, it may be possible to minimize the effect of bending deformation of the installation surface by the forces in the direction of the rotation axis, and thereby to sense the forces in the direction of the rotation axis more accurately, as compared to the case where the installation surface to which the strain sensor is mounted is oblique with respect to the rotation axis.

In the tunnel boring machine according to one aspect, it is more preferable that the cutter head includes a spoke extending in a radial direction, the strain sensor is provided in installation surfaces of the spoke of the cutter head, the installation surfaces being substantially parallel to the rotation axis, and the data processing unit is configured to calculate rotational direction distribution of forces acting on the spoke in a rotational direction, based on the sensing results of the strain sensor and the rotational position sensing unit. With this arrangement, it may be possible to obtain the distribution of the forces acting on the spokes of the cutter head in the rotational direction, the forces being produced as reaction forces against the rotational force of the cutter driving unit. As a result, it may be possible to grasp whether an eccentric load is present in the distribution of the forces in the rotational direction and where the eccentric load is present. Therefore, it may be possible to grasp a sudden change of strata during boring or an encounter with a buried object, and further, it may be possible to grasp the location of the change of strata and the position of the buried object relative to a boring surface. With this arrangement, ability to grasp these conditions may help to prevent troubles in boring a tunnel.

Advantages

As described above, the present invention enables accurately sensing the distribution of forces acting on the cutter head.

BRIEF DESCRIPTION OF THE DRAWINGS

FIG. 12A is a schematic longitudinal sectional view of a tunnel boring machine according to a second embodiment of the present invention. FIG. 12B is a schematic front view of a part of the tunnel boring machine shown in FIG. 12A.

FIG. 14A is a schematic longitudinal sectional view of a tunnel boring machine according to a third embodiment of the present invention. FIG. 14B is a schematic front view of a part of the tunnel boring machine shown in FIG. 14A.

DESCRIPTION OF EXAMPLE EMBODIMENTS

Figure 1:
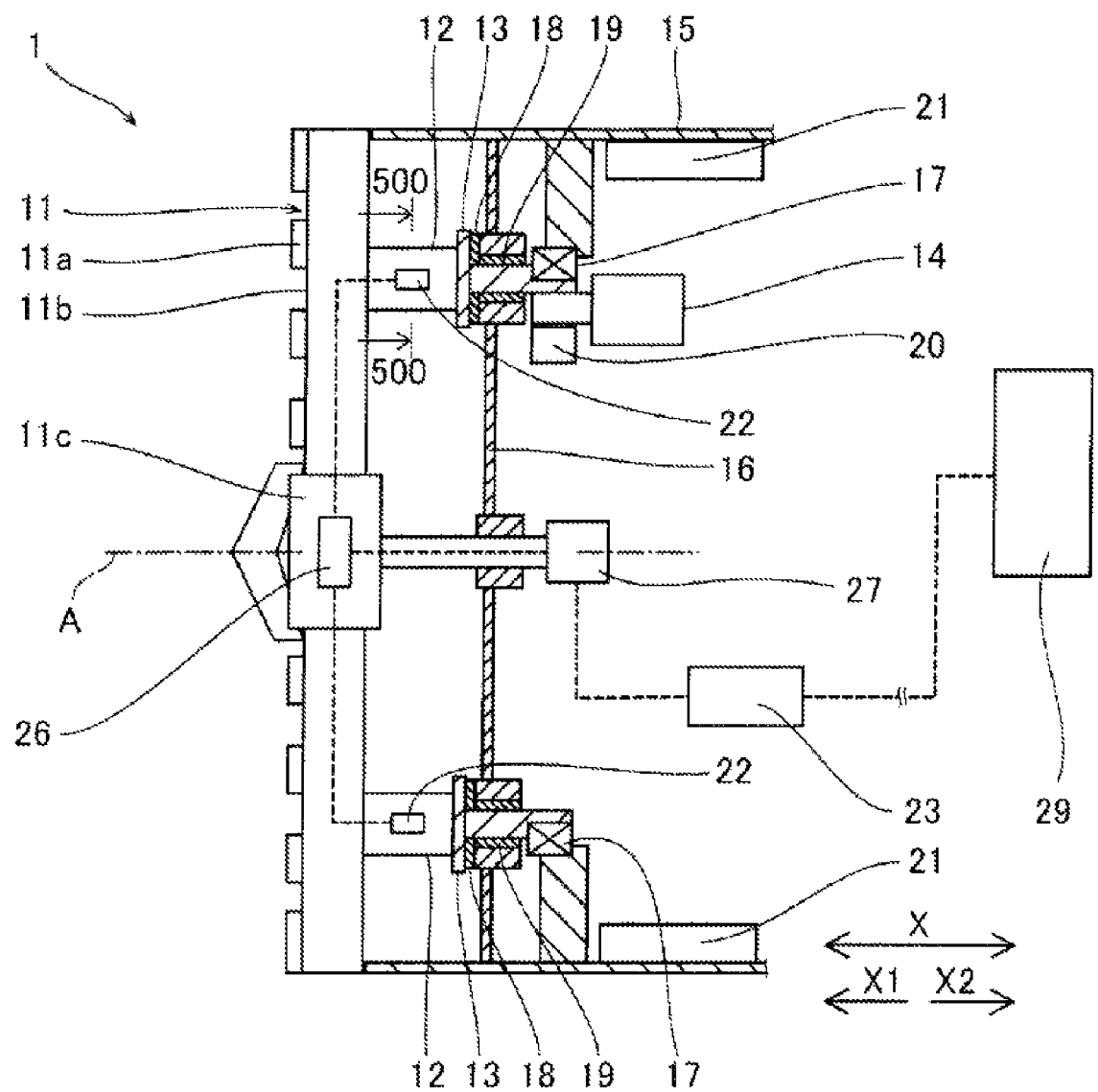
FIG. 1 is a schematic longitudinal sectional view of a tunnel boring machine according to a first embodiment of the present invention.

Embodiments of the present invention will be hereinafter described with reference to the drawings.

First Embodiment

The whole constitution of the tunnel boring machine according to the first embodiment of the present invention will now be described with reference to FIGS. 1 to 5.

The tunnel boring machine 1 may include a cutter head 11 that constitutes a boring surface, a cutter column 12 and a rotation base 13, and a cutter driving unit 14. In the first embodiment, the tunnel boring machine 1 may have a medium to large diameter and adopt the intermediate support structure for supporting the cutter head 11. In the intermediate support structure, the cutter head 11 may be mounted to an annular rotation base 13 to be driven rotationally, via a leg portion (a cutter column 12) extending in the rotation axis (the direction X). The rotation base 13 may be supported by a bearing 17 provided on a bulkhead 16 in a front trunk 15, so as to be rotatable around the rotation axis. The cutter column 12 is an example of "a cutter support" of the present invention.

The following description refers only to portions of the cutter head 11 and the front trunk 15 of the tunnel boring machine 1, and does not refer to other portions such as a rear trunk.

The cutter head 11 may have a circular shape (see FIG. 2) as viewed from the direction of boring, and may be configured to rotate around the rotation axis A. The cutter head 11 may have cutter bits 11a on a boring surface facing forward in the direction of boring (the direction X1). Each of a plurality of spokes 11b (see FIG. 2) arranged radially may have a plurality of cutter bits 11a mounted thereto. The material excavated by the cutter bits 11a may be moved through a through-hole to the interior of the cutter head 11, and in the case of the each pressure shield, the material may be conveyed by a screw conveyor (not shown) to the outside of the cutter head 11. In the case of the muddy water shield, muddy water may be conveyed into a cutter chamber between the cutter head 11 and the bulkhead 16 where the excavated material may be slurried, and the slurried excavated material may be discharged through a pipe (not shown).

The cutter column 12 may be constituted by a beam member having a hollow tubular shape and configured to support the cutter head 11 and rotate along with the cutter head 11. The cutter column 12 may have the front (the direction X1) end thereof mounted to the spoke 11b of the cutter head 11 and the rear (the direction X2) end thereof mounted to the rotation base 13.

Figure 2:
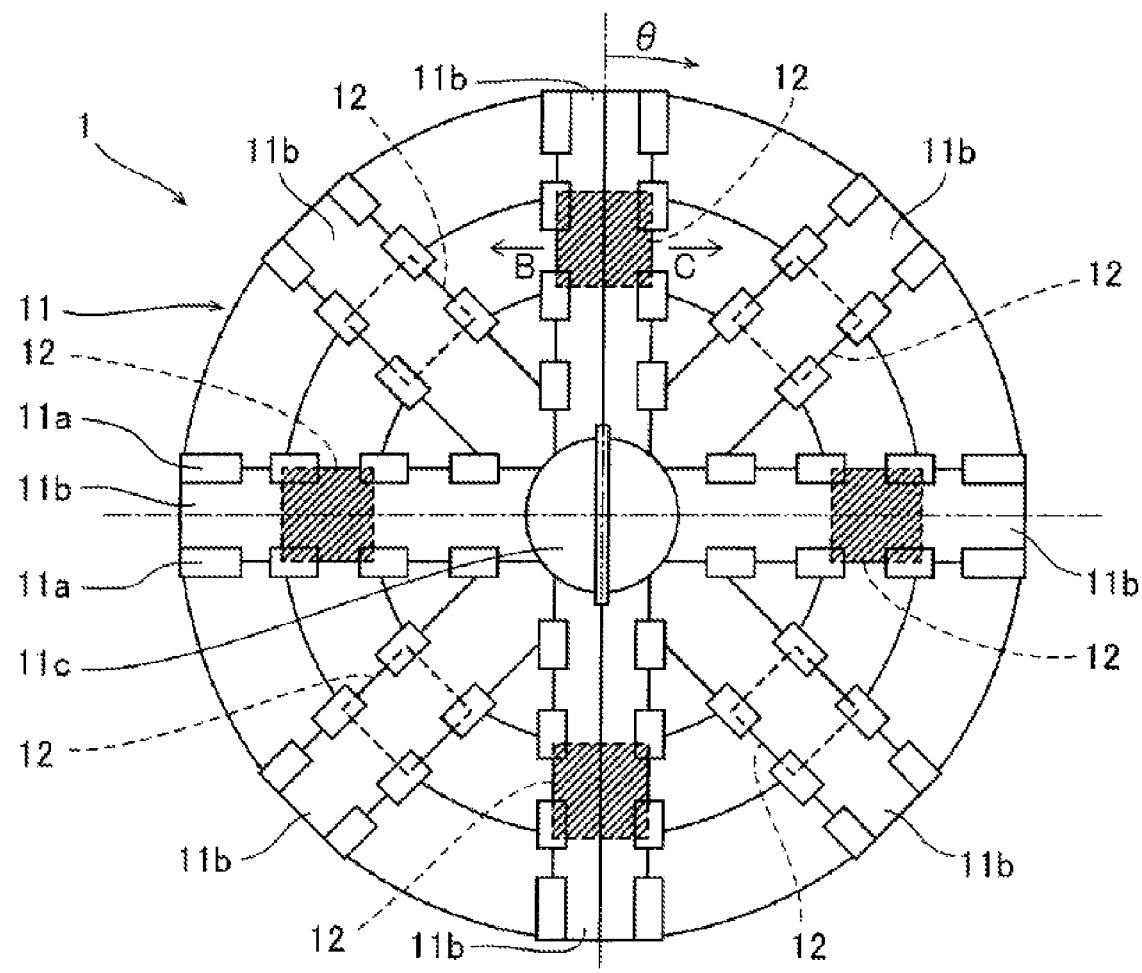
FIG. 2 is a schematic front view of the tunnel boring machine according to the first embodiment of the present invention.

As shown in FIG. 2, a plurality of cutter columns 12 may be arranged at a distance in the radial directions from the rotation axis A at regular angular intervals. More specifically, the cutter head 11 may include eight spokes 11b arranged at intervals of 45°, and each of the spokes 11b may be provided with one cutter column 12. There may be eight cutter columns 12 provided in total. Therefore, the cutter columns 12 may be arranged at regular angular intervals of 45° around the rotation axis A. The cutter columns 12 may have a prism shape.

Referring to FIG. 1 again, the rotation base 13 may have an annular shape, and may support the plurality (eight) of cutter columns 12 on the front (the direction X1) side thereof. The rotation base 13 may be supported by the bearing 17 provided on the bulkhead 16 in the front trunk 15, so as to be rotatable around the rotation axis A. There may be provided seal portions 18 and 19 that provide sealing between the rotation base 13 and the bulkhead 16. The seal portion 18 may be provided so as to maintain a seal clearance in the direction of the rotation axis, and the seal portion 19 may be provided so as to maintain a seal clearance in the radial direction.

The cutter driving unit 14 may be positioned in rear (the direction X2) of the bulkhead 16 and may be configured to apply a driving torque to the rotation base 13 and rotationally drive the rotation base 13 around the rotation axis A. Thus, the cutter head 11 is supported by the cutter columns 12 and the rotation base 13 so as to be rotatable around the rotation axis A. The cutter head 11, the cutter column 12, and the rotation base 13 may be integrally rotated by the cutter driving unit 14. In contrast, the front trunk 15 and the bulkhead 16 may be stationary and may not be rotated.

The tunnel boring machine 1 may include a rotary encoder 20 (hereinafter referred to as "the encoder 20") configured to sense the position of the cutter head 11 in the rotational direction (the rotational angle). The encoder 20 may be provided in rear (the direction X2) of the bulkhead 16, and may be configured to sense the rotational angle of the cutter head 11 (the rotation base 13). The encoder 20 may be an absolute encoder that senses the absolute position of the rotational angle, or more specifically, a rotational angle θ (0 to 359°) with respect to a reference position of the cutter head 11 (e.g., the position shown in FIG. 2). The encoder 20 may be an example of "a rotational position sensing unit" of the present invention.

The tunnel boring machine 1 may be thrusted in the direction of boring (the direction X1) by the thrust force of the thrust jacks 21 provided in the front trunk 15. The front of the direction of the rotation axis may be the direction of boring. A plurality of thrust jacks 21 may constitute one block, and a plurality of blocks may be arranged on the substantially entire inner circumference of the front trunk 15 having a cylindrical shape. The thrust force (the jack thrust force) of the thrust jacks 21 can be controlled for each block.

In the first embodiment, the tunnel boring machine 1 may include a strain sensor 22 for measuring the force acting on the cutter head 11, and a data processing device (a data processing unit) 23 for calculating the force acting on the cutter head 11 from the sensing result of the strain sensor 22. The strain sensor 22 can be provided on either the cutter head 11 or the cutter column 12. In the first embodiment, the strain sensor 22 may be provided on the cutter column 12.

There may be three or more strain sensors 22 arranged at regular rotation angle intervals. More specifically, as shown in FIG. 2, the strain sensor 22 may be provided in each of four cutter columns 12 (the crosshatched portions) arranged at about 90° intervals among the eight cutter columns 12 arranged at about 450 regular intervals. Thus, there may be four strain sensors 22.

Since the strain sensors 22 are arranged at the angular intervals of 90°, which is equal to one-fourth of 360°, measurements of the strain for one rotation can be obtained by only one-fourth rotation of the cutter head 11. In addition, even when the cutter head 11 is stopped, it may be possible to obtain the distribution of forces at the four points in the boring surface of the cutter head 11. It may also be possible to provide only one strain sensor. In this case, one rotation of the cutter head 11 may provide the measurements of the strain for the whole circumference in the rotational direction. Further, it may also be possible to provide all of the eight cutter columns with a strain sensor.

Figure 3:
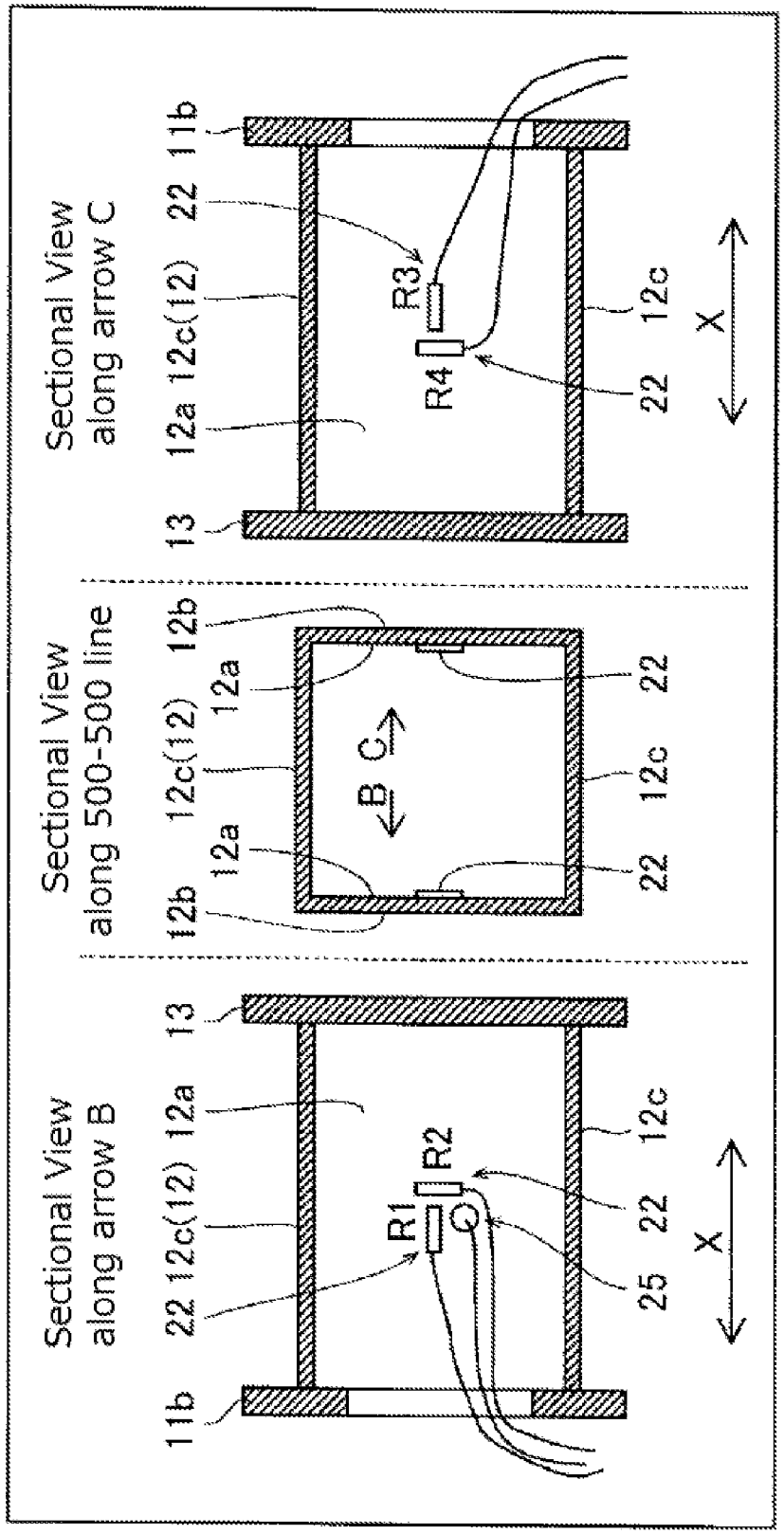
FIG. 3 is a development view of the interior of a cutter column of the tunnel boring machine shown in FIG. 1, including a sectional view of the cutter column along the 500-500 line and sectional views along the arrows B and C.

As shown in FIG. 3, the strain sensors 22 may be mounted to installation surfaces 12a of the cutter column 12, the installation surfaces 12a being substantially in parallel with the rotation axis of the cutter head 11. More specifically, the cutter column 12 may have a rectangular tube shape having a rectangular section and may be constituted by a pair of side surfaces 12b facing the circumferential direction and a pair of side surfaces 12c facing the radial direction. The strain sensors 22 may be mounted to the installation surfaces 12a that are the inner surfaces of the pair of side surfaces 12b facing the circumferential direction. In the example shown in FIG. 3, both of the side surfaces 12b facing the circumferential direction and the side surfaces 12c facing the radial direction may be substantially parallel with the direction of the rotation axis.

Figure 4:
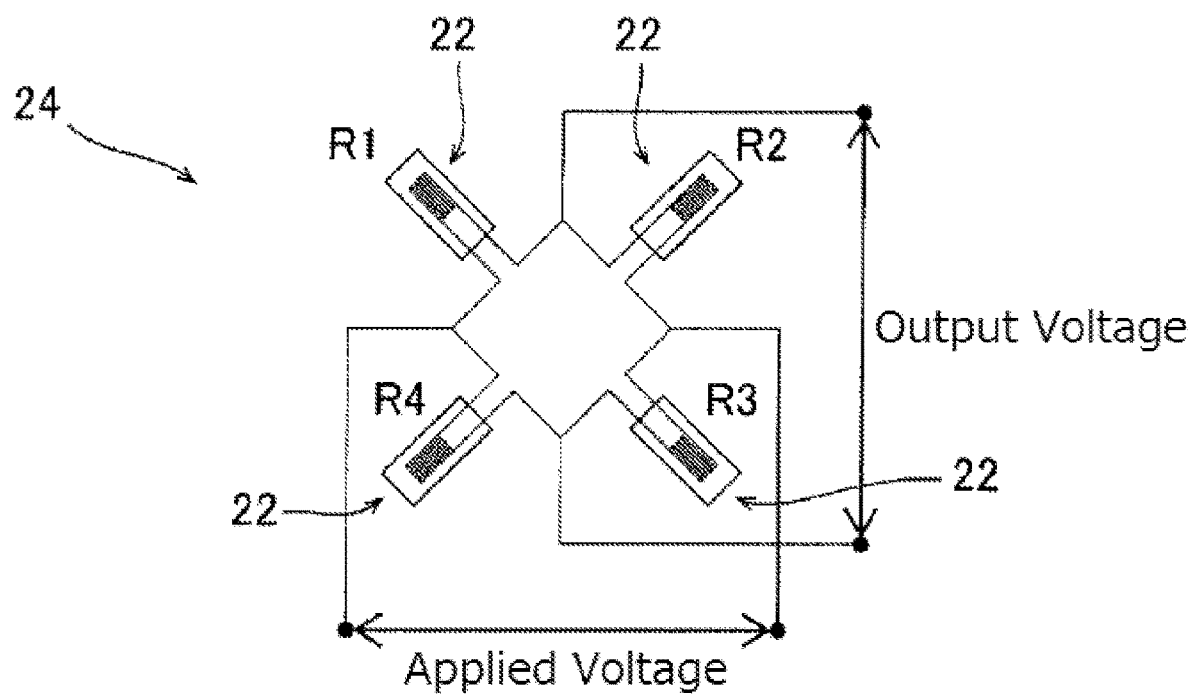
FIG. 4 shows a bridge circuit for measuring strain by a strain sensor.

On each of the pair of installation surfaces 12a, there may be mounted two strain sensors 22. On one cutter column 12, there may be mounted four strain sensors 22 in total. Of the two strain sensors 22 mounted to each installation surface 12a, one may be arranged substantially in parallel with the direction of the rotation axis (the direction X), and the other may be arranged substantially perpendicular to the rotation axis (the direction X). In other words, the strain in the direction of the rotation axis may be measured by the 4-gage system in which the strain sensors are arranged perpendicular to each other. Since the main force acting on the cutter head 11 is the thrust force in the boring direction, the strain of the cutter column 12 may occur mainly in the direction of compressing toward the boring direction (the direction of the rotation axis, the direction X). Therefore, in the 4-gage system with perpendicular arrangement described above, the sensitivity of the strain in the direction of the rotation axis (the compression) during boring may be higher than in measurement by the 1-gage system, and the effects of the stress component in other directions may be eliminated. As shown in FIG. 4, the measurement of strain by the 4-gage system can be performed by taking an output voltage from a bridge circuit 24 including four strain sensors 22 (R1 to R4) connected together. Thus, four strain sensors 22 may be used for one cutter column 12, and the compressive strain of the cutter column 12 in the direction of the rotation axis (the direction of boring, the direction X) may be measured with these strain sensors 22.

In the first embodiment, the tunnel boring machine 1 may include a temperature sensor 25 provided near the strain sensors 22. The temperature sensor 25 may be provided on one of the installation surfaces 12a and sense the temperature near the strain sensor 22. In boring, the temperatures of the cutter head 11 and the cutter columns 12 may be increased due to the heat produced in boring (the boring heat). The temperature sensor 25 may be provided to eliminate the effect of the boring heat on the strain measurement by temperature compensation.

Figure 5:
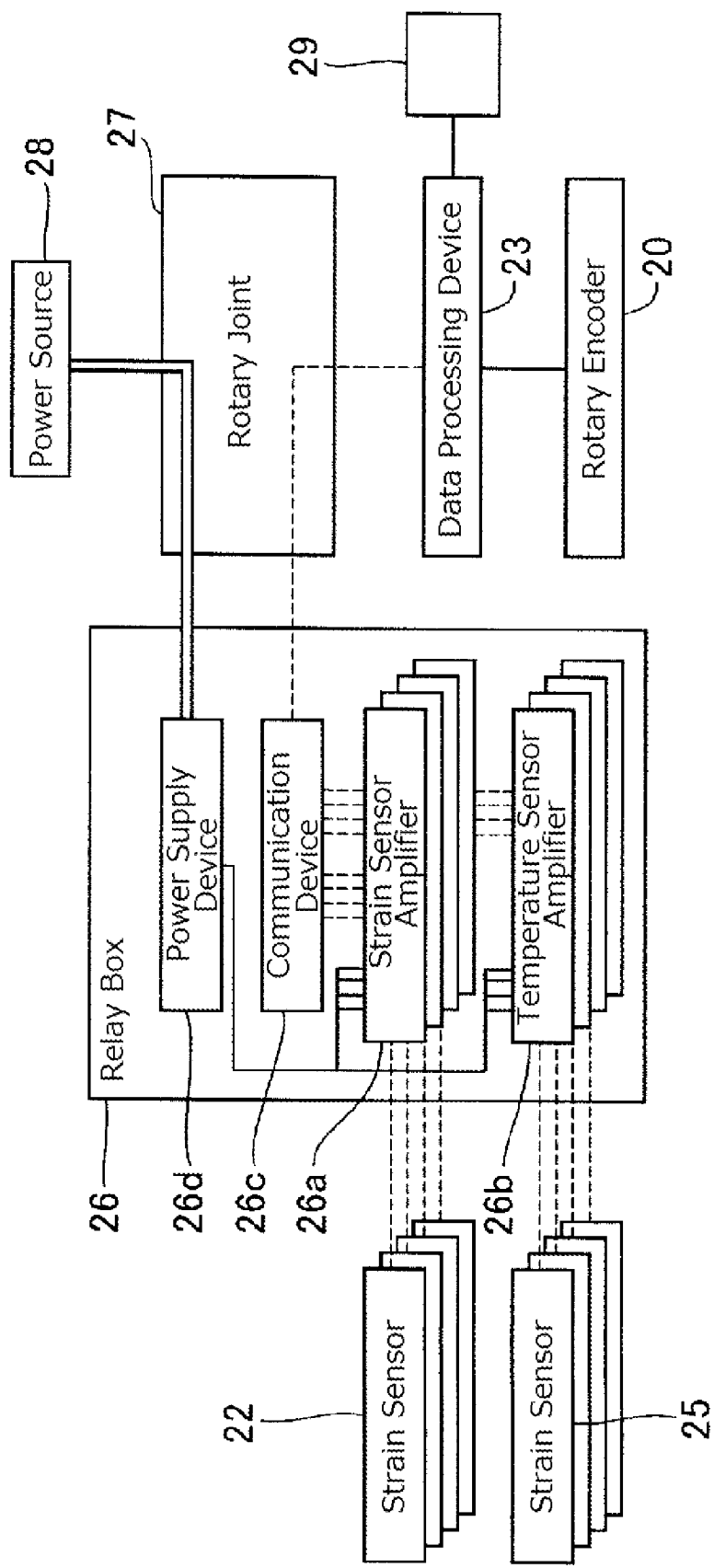
FIG. 5 is a block diagram showing a device for measuring strain.

As shown in FIG. 1, each of the strain sensors 22 may be connected to a relay box 26 provided in a central portion 11c of the cutter head 11. As shown in FIG. 5, the relay box 26 may include amplifiers 26a for the strain sensors 22, amplifiers 26b for the temperature sensors 25, a communication device 26c, and a power supply device 26d The communication device 26c may be connected to the data processing device 23 via a rotary joint 27. The communication device 26c may convert signals outputted from the amplifiers 26a and the amplifiers 26b into sensing signals and output the sensing signals to the data processing device 23. The power supply device 26d may be connected to an external power source 28 via the rotary joint 27. The power supply device 26d may supply power to the amplifiers 26a, the amplifiers 26b, and the communication device 26c.

The data processing device 23 may be a computer including a CPU and memory devices. The data processing device 23 may calculate the force acting on the cutter header 11 in association with the position of the cutter head 11 in the rotational direction (the rotational angle θ), based on the sensing results of the strain sensors 22 and the encoder 20. In the first embodiment, the data processing device 23 may be configured to obtain the rotational direction distribution of the forces acting on the cutter head 11 in the direction of the rotation axis (the direction X) based on the sensing results of the strain sensors 22 and the encoder 20.

The data processing device 23 may be connected to the relay box 26 via the rotary joint 27 and may obtain the sensing signals of the strain sensors 22 from the communication device 26c of the relay box 26. The data processing device 23 may also obtain from the encoder 20 the sensing signal of the position of the cutter head 11 in the rotational direction (the rotational angle θ). The data processing device 23 may sequentially perform calculation for each rotational angle obtained from the encoder 20 in association with the measurements of the strain of the cutter columns 12, and record the calculated values. Further, the data processing device 23 may calculate, from the strain measurements in association with the rotational angle of the cutter columns 12, the rotational direction distribution of the forces acting on the cutter head 11 in the direction of the rotation axis (the direction X). In addition to the rotational direction distribution of the forces acting on the cutter head 11, the data processing device 23 can also calculate the average value of the forces acting in the direction of the rotation axis obtained from the four strain sensors 22 at a point of time (the thrust force acting on the cutter head 11).

Further, the data processing device 23 may obtain the sensing signals of the temperature sensors 25 from the communication device 26c of the relay box 26. The data processing device 23 may also be configured to perform temperature compensation on the sensing results of the strain sensors 22 based on the temperatures near the strain sensors 22 sensed by the temperature sensors 25. The temperature compensation may be performed using a temperature compensation function prepared previously. The temperature compensation function may associate the temperature sensed by the temperature sensor 25 and the amount of compensation of the strain sensor 22. In the embodiment, the data processing device 23 may be configured to perform temperature compensation when the cutter column 12 has a temperature equal to or higher than a prescribed value. For example, the data processing device 23 may perform temperature compensation when the temperature sensed by the temperature sensor 25 is equal to or higher than 50° C. It may also be possible that the data processing device 23 is configured to perform temperature compensation constantly.

As shown in FIG. 1, the data processing device 23 may be connected to a computer in an operation room 29 of the tunnel boring machine 1 and a computer in a monitoring room (not shown) on the ground. The measurement data obtained can be outputted to these computers. For example, the data processing device 23 can output time variation of the force (the thrust force) acting on the cutter head 11 in the direction of the rotation axis or time variation of strain (see FIGS. 8 and 9) and a plot of the force acting on the cutter head 11 in the direction of the rotation axis or strain in association with the rotational angle (a radar chart, see FIG. 11).

Figure 11:
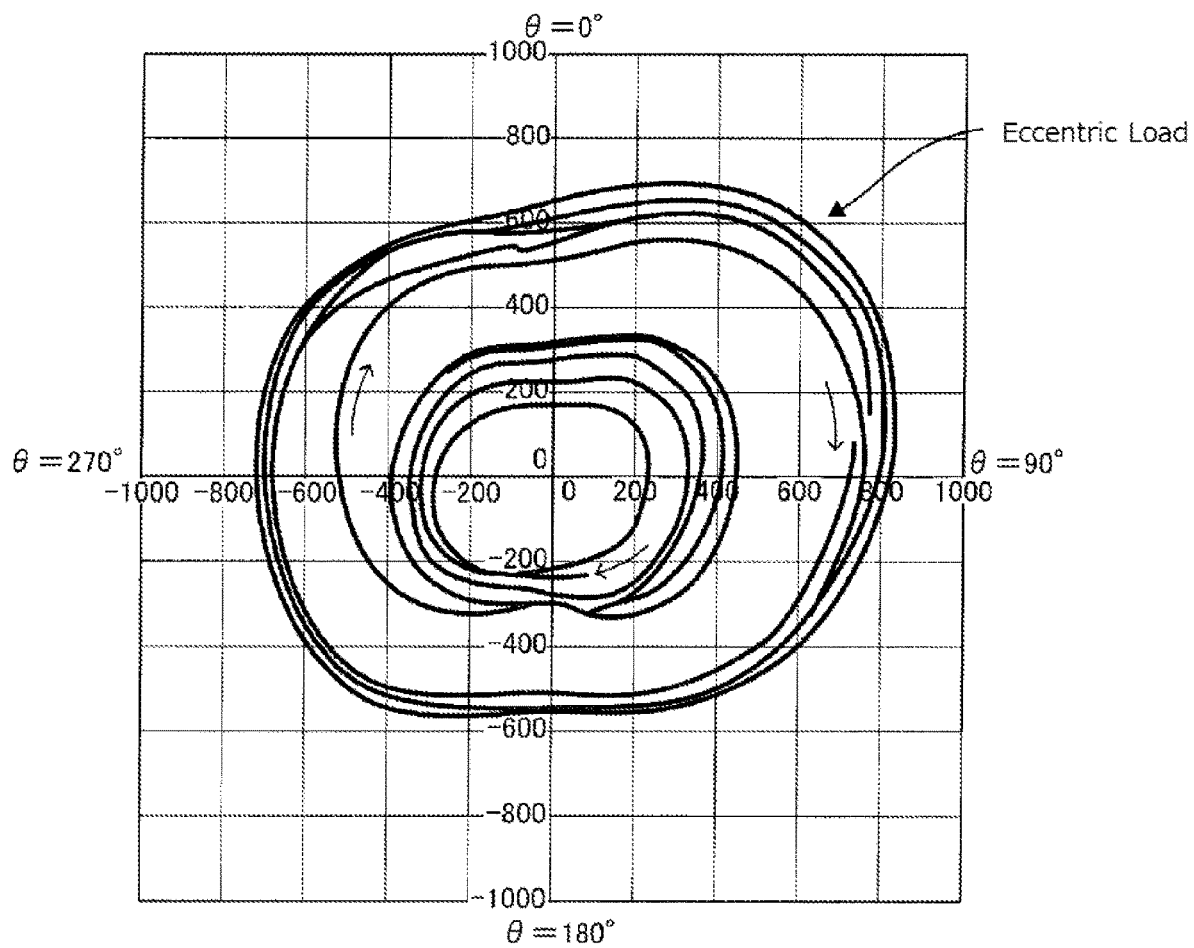
FIG. 11 is a radar chart showing the measurement result of strain of FIG. 9 in association with the rotational angle of the cutter head.

In the radar chart of FIG. 11, a radial direction from the center may indicate the magnitude of the force acting on the cutter head 11 in the direction of the rotation axis (the magnitude of strain), and a rotational direction may indicate the rotational angle θ of the cutter head 11. As the distribution of the forces (loads) is more uniform, the locus of the plot may approximate a precise circle around the center of the chart. When an eccentric load occurs, the locus of the plot may be deformed from the precise circle. Therefore, when for example, there is an overload at a rotational angle in the chart of FIG. 11, the data processing device 23 can send an alert to the operation room 29. For example, when the allowable range of the load is constant irrespective of the rotational angle, a threshold range having a precise circular shape can be drawn in the radar chart of FIG. 11, and the data processing device 23 can make an alert upon occurrence of an eccentric load exceeding the threshold value. It may also be possible that upon occurrence of an eccentric load exceeding the threshold value, the data processing device 23 sends a stop signal to cause the tunnel boring machine 1 to stop automatically or control the thrust force such that the eccentric load is not larger than the preset value.

Figure 6:
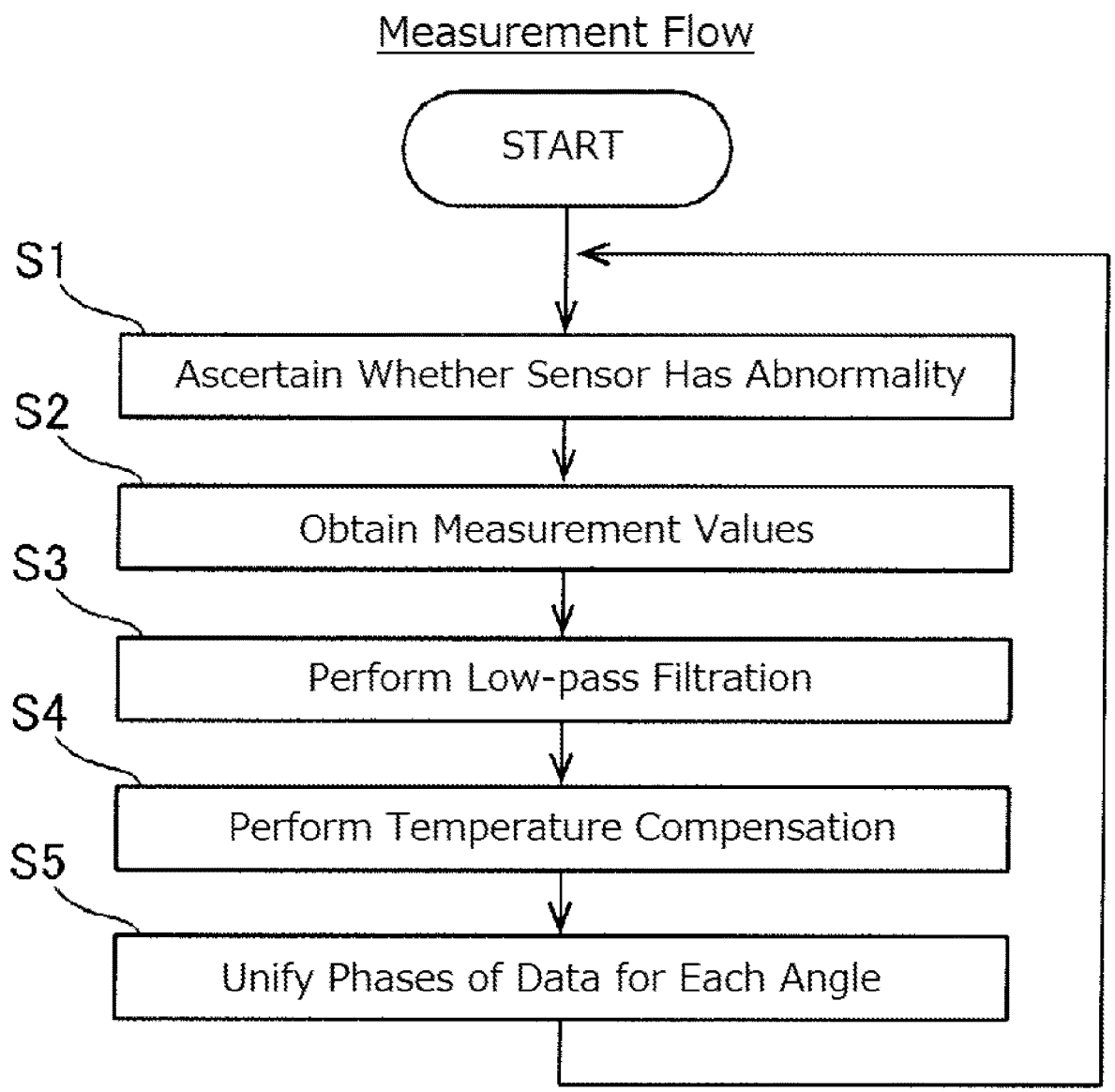
FIG. 6 is a flowchart of strain measurement performed by a data processing device of the tunnel boring machine according to the first embodiment of the present invention.
Figure 7:
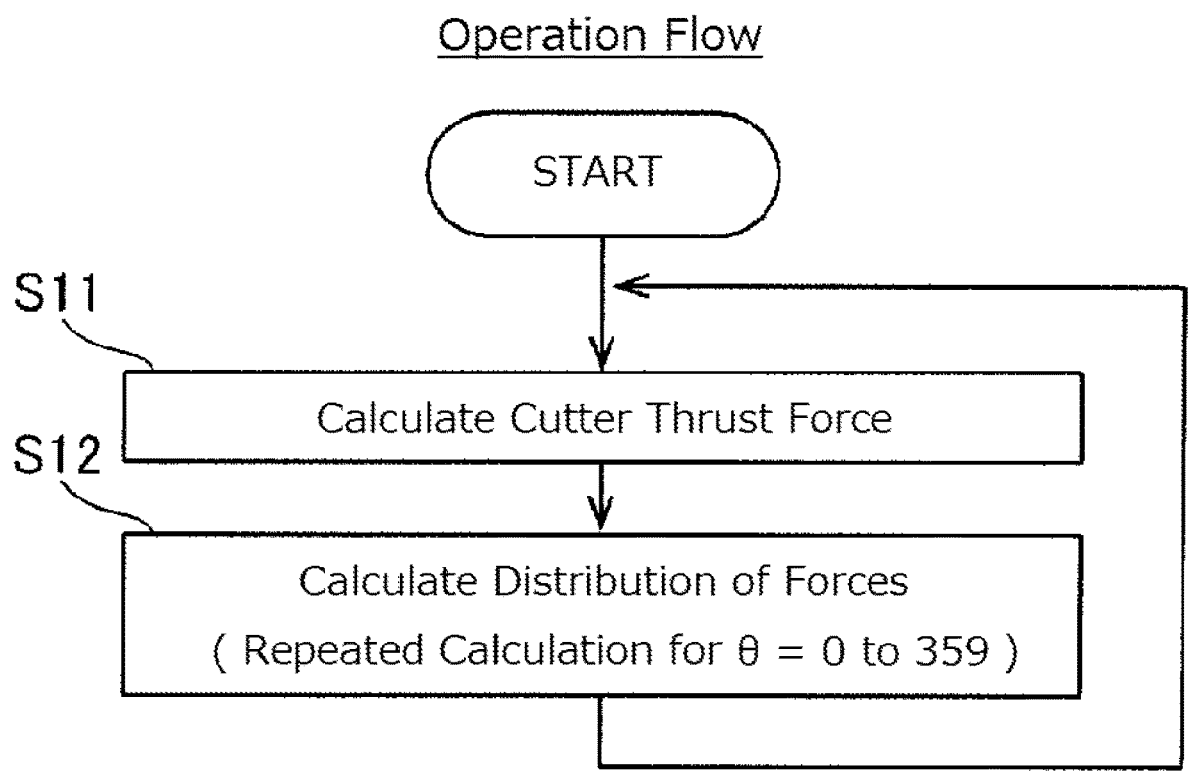
FIG. 7 is a flowchart of operation performed by a data processing device of the tunnel boring machine according to the first embodiment of the present invention.

Next, the processing of the data processing device 23 of the tunnel boring machine 1 according to the first embodiment will be described with reference to FIGS. 6 and 7. The measurement flow shown in FIG. 6 represents a process of obtaining measurement results from the strain sensors 22 for each sampling cycle (e.g., 0.1 second). The operation flow shown in FIG. 7 represents a process of calculating the force acting on the cutter head 11 (the cutter thrust force) and the distribution in the rotational angular direction of the forces from the obtained strain measurement data in association with the rotational angle for each prescribed cycle (e.g., one second).

In the measurement flow in FIG. 6, the data processing device 23 may ascertain in step S1 whether the sensors has abnormality. The data processing device 23 may detect abnormality of the strain sensors 22 and the temperature sensors 25 (hereinafter referred to as Temperature 1 to Temperature 4) provided on the four cutter columns 12. In the 4-gage system, four strain sensors 22 are used to measure strain of one cutter column 12. Therefore, the four strain sensors 22 for each cutter column 12 are regarded as one unit, and the four units of the strain sensors are hereinafter referred to as Gage 1 to Gage 4. For a sensor having abnormality such as disconnection or short circuit, the data processing device 23 may apply "0" to the sensing value indicating the status of the sensor, and for a sensor having no abnormality, the data processing device 23 may apply "1" to the sensing value. For Gage 1 to Gage 4, the value of "0" or "1" may be applied to the respective sensing values EG1 to EG4. For Temperature 1 to Temperature 4, respective sensing values ET1 to ET4 can be obtained in the same manner.

In step S2, the data processing device 23 may obtain the measurement values. More specifically, the measurement value θ of the rotational angle (the cutter position) with respect to a prescribed reference rotational position of the cutter head 11 is obtained from the encoder 20. The rotational angle θ may be obtained in units of one degree within a range from 0 to 359°. In addition, the strain measurements G1a to G4a may be obtained from the strain sensors 22 as Gage 1 to Gage 4. The strain measurements for Gage 1 to Gage 4 at a rotational angle θ may be obtained at positions having phases differentiated from one another by 90° in the rotational direction. Further, the temperature measurements T1a to T4a of the temperatures near the strain sensors 22 may be obtained from the associated temperature sensors. The instantaneous value at the point of sampling for each sensor may be obtained as a measurement value.

In step S3, the data processing device 23 may perform the low-pass filtration on the obtained measurements (the strain measurements G1a to G4a and the temperature measurements T1a to T4a) to remove high frequency components (noise). The low-pass filtration may be performed by applying a low-pass filtration function f1 such as a moving average or a window function to the measurement value. Thus, the strain measurement and the temperature measurement subjected to the low-pass filtration may be obtained as follows: GNb=f1(GNa), and TNb=f1(TNa) (N ranges from 1 to 4). When the noise of the measurements is not large, the low-pass filtration is not necessary.

In step S4, the data processing device 23 may perform the temperature compensation process on the strain measurements G1b to G4b subjected to the low-pass filtration using the temperature measurements T1b to T4b, for temperature compensation with respect to the temperature change in boring. As described above, the temperature compensation process may be performed using the preset temperature compensation function f2. Thus, the strain measurements subjected to the temperature compensation process may be obtained as follows: GNc=f2(GNb, TNb) (N ranges from 1 to 4).

In step S5, the data processing device 23 may perform a process of unifying the phases of the rotational angles (rearrangement of data) on the strain measurements G1c to G4c of strain sensors 22 subjected to the temperature compensation process, so as to arrange the measurements as data in units of rotational angle θ with respect to a reference angle.

More specifically, the data processing device 23 may rearrange the current strain measurements G1c to G4c of the Gage 1 to Gage 4 subjected to the temperature compensation process, as the data for four rotational angles, as follows.

$$G1(\theta)=G1c$$

$$G2(\theta+90°)=G2c$$

$$G3(\theta+180°)=G3c$$

$$G4(\theta+270°)=G4c$$

Therefore, when the measurement is continued while rotating the cutter head 11, one rotation of the cutter head 11 may produce four strain measurements G1(θ) to G4(θ) in association with the rotational angle θ (θ ranges from 0° to 359°).

The above measurement flow may be looped for each sampling cycle to sequentially obtain strain measurements in association with the rotational angle.

In the operation flow in FIG. 7, the data processing device 23 may calculate in step S11 the thrust force (the cutter thrust force) acting on the cutter head 11. The cutter thrust force may be calculated from the average of the strain measurements of the strain sensors 22 obtained at the same time. The force (the cutter thrust force F) acting on the cutter head 11 at a time t may be expressed by Formula (1) below.

$$F(t)=K \times G_{ave}(t)$$

$$G_{ave}(t)=(G1c \times EG1+G2c \times EG2+G3c \times EG3+G4c \times EG4)/(EG1+EG2+EG3+EG4) \quad (1)$$

K is a coefficient for converting strain to the thrust force (stress). $G_{ave}(t)$ is an average of the strain measurements obtained from Gage 1 to Gage 4 that were determined to be in a normal state by ascertaining the presence of abnormality. Therefore, when only Gage 4 is determined to be in an abnormal state in step S1 of FIG. 6, EG4=0, and the average of the strain measurements of the Gages other than Gage 4 which is determined to be in an abnormal state may be calculated.

In step S12, the data processing device 23 may calculate the rotational direction distribution of the forces acting on the cutter head 11. More specifically, the data processing device 23 may calculate the forces acting on the cutter head 11 in the direction of the rotation axis in association with the rotational angle θ. The force F(θ) for a rotational angle θ can be expressed as Formula (2) below.

$$F(\theta)=K \times G_{ave}(\theta)$$

$$G_{ave}(\theta)=(G1(\theta) \times EG1+G2(\theta) \times EG2+G3(\theta) \times EG3+G4(\theta) \times EG4)/(EG1+EG2+EG3+EG4) \quad (2)$$

$G_{ave}(\theta)$ is the average of the strain measurements for the same rotational angle θ obtained in step S5 of FIG. 6. The data processing device 23 may repeatedly calculate the force F(θ) for the rotational angle θ ranging from 0° to 359° to obtain the rotational direction distribution of the forces acting on the cutter head 11 in the direction of the rotation axis.

The above operation flow may be looped for a prescribed cycle to obtain the thrust forces F(t) at times t and the distribution F(θ) of the forces acting on the cutter head 11 in the direction of the rotation axis.

The first embodiment provides the following advantageous effects.

In the first embodiment, as described above, the strain sensors 22 may be provided on the cutter columns 12. Therefore, the forces actually acting on the cutter head 11 can be sensed more directly and accurately from the strain occurring in the cutter columns 12, as compared to the case where the forces acting on the cutter head 11 are estimated from the jack thrust force and the like. In addition, the tunnel boring machine 1 includes the encoder 20 for sensing the position of the cutter head 11 in the rotational direction (the rotational angle θ), and the data processing device 23 for calculating the forces acting on the cutter head 11 in association with the position of the cutter head 11 in the rotational direction, based on the sensing results of the strain sensors 22 and the encoder 20. Therefore, the forces acting on the cutter head 11 obtained from the strain sensors 22 can be obtained as the rotational direction distribution over, for example, one rotation (360°) of the cutter head 11. With these arrangements, the tunnel boring machine 1 of the first embodiment can accurately sense the distribution F(θ) of the forces acting on the cutter head 11. As a result, it can be determined from the obtained distribution of the forces whether the cutter head 11 is subjected to an eccentric load and at what position in the rotational direction the eccentric load has occurred. Thus, it may be possible to grasp early the change of strata and the presence and the position of a buried object, and it can be prevented that the cutter head 11 and the cutter driving unit 14 are damaged and the cutter bits are worn abnormally due to the change of strata and the presence of a buried object.

In the first embodiment, as described above, the data processing device 23 may be configured to obtain the rotational direction distribution F(θ) of the forces acting on the cutter head 11 in the direction of the rotation axis (the direction X) based on the sensing results of the strain sensors 22 and the encoder 20. Thus, it may be possible to obtain the distribution F(θ) of the forces acting on the cutter head 11 in the direction of the rotation axis, the forces being produced as reaction forces against the thrust force for boring. As a result, it may be possible to grasp a sudden change of strata in front of the tunnel boring machine boring forward or an encounter with an buried object based on whether an eccentric load is present in the distribution F(θ) of the forces in the direction of the rotational axis, and it may be possible to grasp the location of the change of the strata and the position of the buried object with respect to a boring surface. Further, it may be possible to grasp occurrence of local loads on the bearing 17 and the seal portions 18 and 19 of the cutter head 11, for example, the case where a large load has occurred locally while the whole (the average) of the loads is within an allowable range in the distribution F(θ) of the forces in the direction of the rotation axis. Ability to grasp these conditions may help to prevent troubles in boring a tunnel.

With the distribution F(θ) of the forces in the direction of the rotation axis, it may be possible to determine whether or not an overload has occurred locally on the support portions (the cutter columns 12 and the rotation base 13), the bearing 17, the seal portions 18 and 19, or the like of the tunnel boring machine 1, and therefore, it may be possible to control the operation so as to suppress eccentric loads. As a result, it may be possible to suppress the overload on the support portions and the bearing 17 and maintain a seal clearance within a proper range.

In addition, it may be possible to adjust the thrust force distribution among the thrust jacks 21, adjust cylinder strokes (unit thrust distance), and use the measurement results for automatic operation, for example, alerting or emergency stop upon occurrence of an eccentric load, based on the distribution F(θ) of the forces in the direction of the rotation axis. Further, the measurement results of the distribution F(θ) of the forces in the direction of the rotation axis may be continuously recorded, thereby to use the measurement results for preventing failures by previously grasping the tendency of occurrence of an eccentric loads and investigating causes of failures.

In the first embodiment, as described above, three or more strain sensors 22 may be provided on the cutter columns 12 at regular rotation angle intervals. Thus, the distribution of the forces for one rotation of the cutter head 11 can be obtained with a smaller rotation angle. When four strain sensors 22 are provided at intervals of 90° as in the first embodiment, the distribution of the forces for one rotation can be obtained with a one-fourth rotation. As a result, occurrence of an eccentric load on the cutter head 11 can be detected early. Since there are four strain sensors 22, it may be possible to grasp (from the data obtained at four points) the distribution of the forces acting on the cutter head 11 to some degree even when the cutter head 11 is stopped. This may help to grasp the conditions when the tunnel boring machine 1 is stopped upon detection of an eccentric load.

In the first embodiment, as described above, the data processing device 23 may be configured to perform temperature compensation on the sensing results of the strain sensors 22 based on the temperatures near the strain sensors 22 sensed by the temperature sensors 25. Thus, it may be possible to eliminate, by temperature compensation, the effect of temperature change in the cutter head 11 due to the boring heat produced in boring. As a result, the distribution of the forces acting on the cutter head 11 can be sensed more accurately.

In the first embodiment, as described above, the strain sensors 22 may be mounted to installation surfaces 12a of the cutter column 12, the installation surfaces 12a extending substantially in parallel with the rotation axis of the cutter head 11. Thus, it may be possible to minimize the effect of bending deformation of the installation surface 12a by the forces in the direction of the rotation axis, and thereby to sense the forces in the direction of the rotation axis more accurately.

<Description of Result of Experiment>

Next, the result of the demonstration experiment performed on the tunnel boring machine 1 according to the first embodiment will be described. The demonstration experiment was performed when the tunnel boring machine 1 not situated underground is started, so as to accurately calculate the forces (the cutter thrust forces) acting on the cutter head 11 in the direction of the rotation axis from the thrust force of the thrust jacks 21, with the friction force produced by the weight of the tunnel boring machine 1 measured previously for correction. The calculated cutter thrust forces were compared with strain measurements of the cutter column 12 obtained concurrently.

Figure 8:
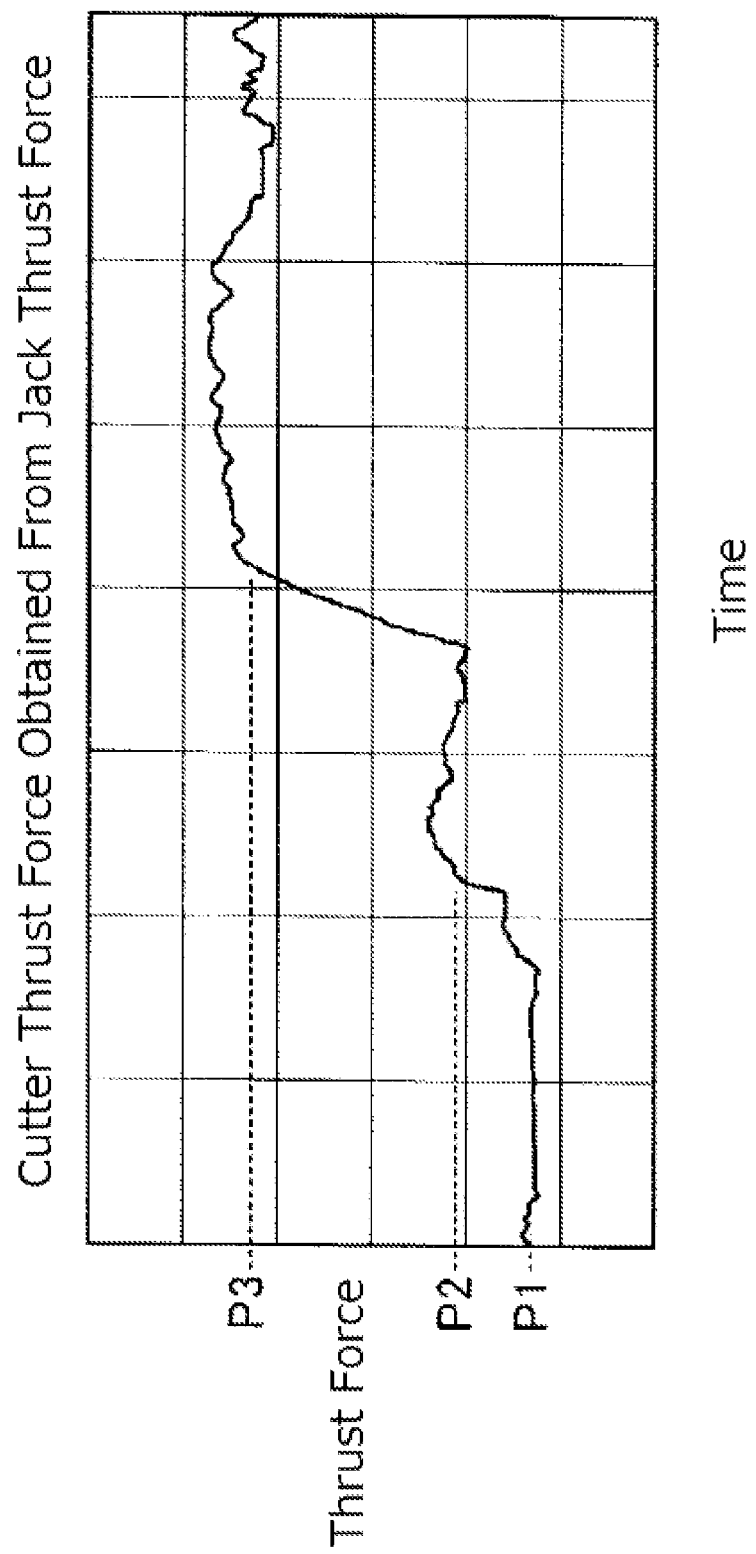
FIG. 8 shows a calculation result of cutter thrust forces obtained from the jack thrust force of the tunnel boring machine.
Figure 9:
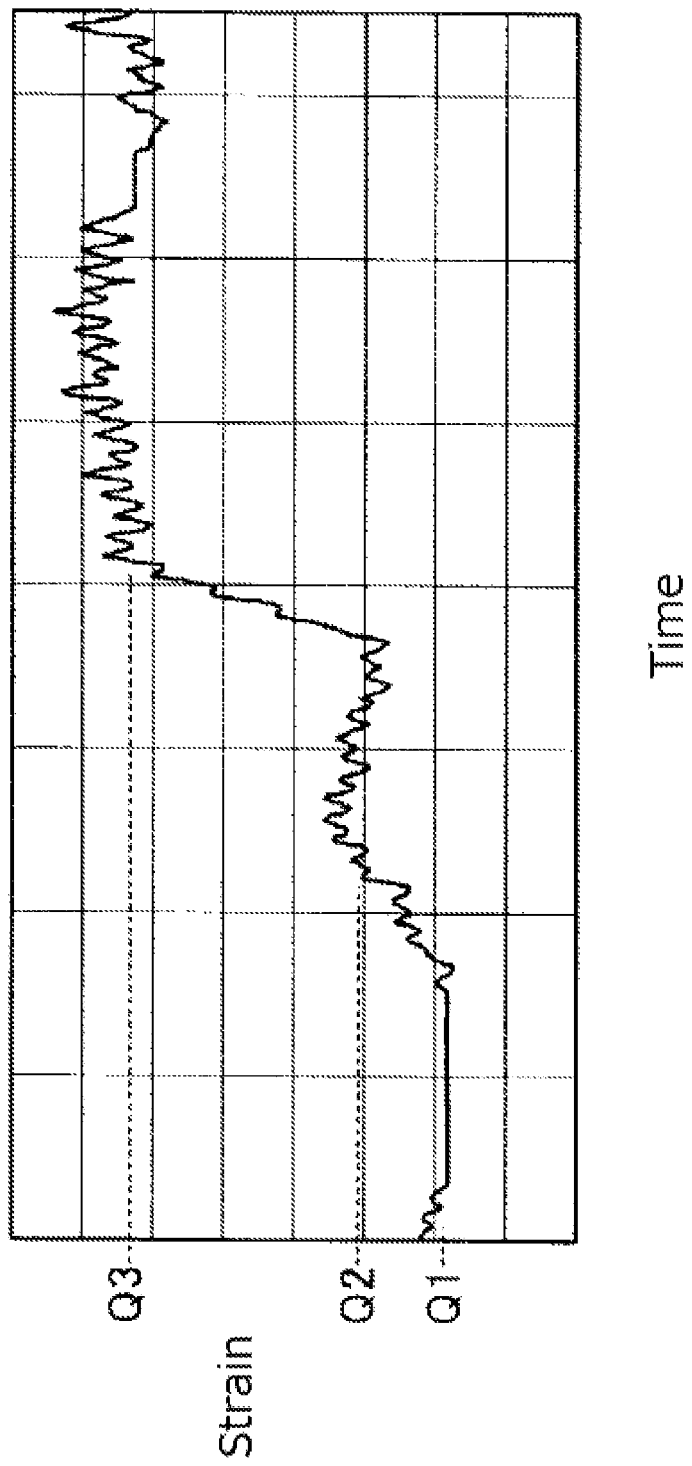
FIG. 9 shows a measurement result of strain of cutter columns obtained during measurement of the cutter thrust force shown in FIG. 8.

FIG. 8 shows time variation of the thrust force (the cutter thrust force) acting on the cutter head 11 which was calculated from the thrust force of the thrust jacks 21. In the measurement, the magnitude of the thrust force was changed between three levels (P1, P2, and P3). FIG. 9 shows time variation of the average of strain measurements of the cutter columns 12 obtained by Formula (1) from the strain sensors 22 mounted to four cutter columns 12. FIG. 9, showing the strain measurement of the cutter columns 12, also includes strain levels Q1, Q2, and Q3 reflecting the three levels of the thrust force corresponding to P1, P2, and P3 in FIG. 8. As will be understood from comparison between FIGS. 8 and 9, the time variation of the strain of the cutter columns 12 approximates the time variation of the thrust force (the cutter thrust force) acting on the cutter head 11.

Figure 10:
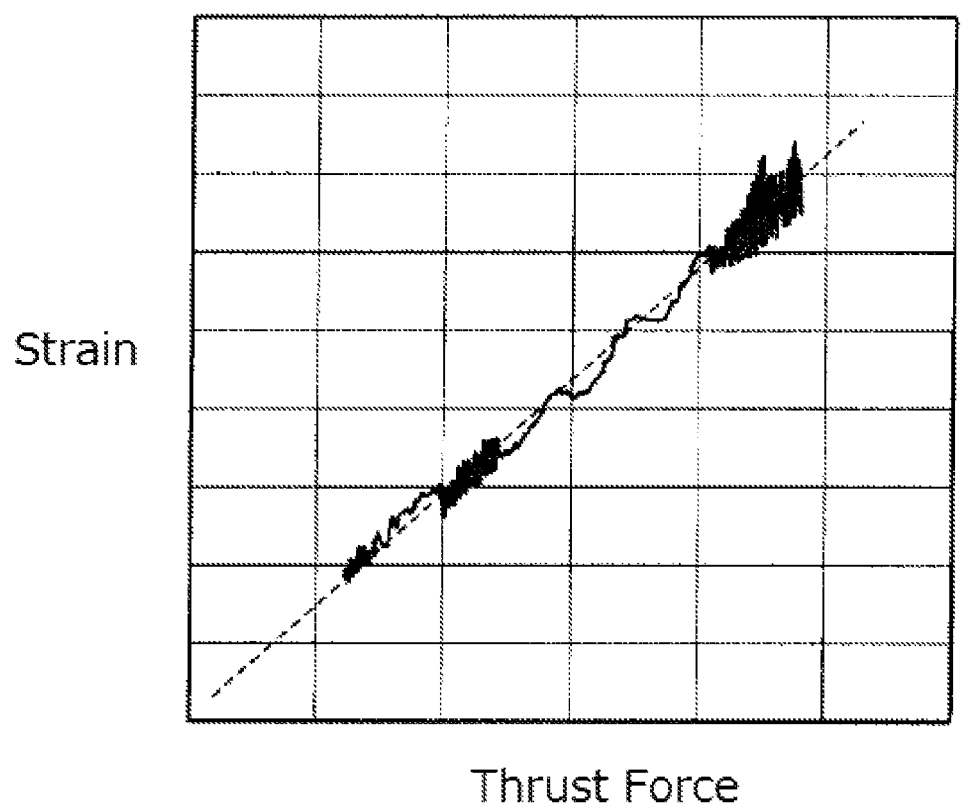
FIG. 10 shows a graph of relationship between the cutter thrust force and the strain of the cutter columns.

FIG. 10 shows the relationship between the cutter thrust force calculated from the thrust force of the thrust jacks 21 (see FIG. 8) and the strain of the cutter columns 12 obtained from the strain sensors 22 (see FIG. 9). The cutter thrust force acting on the cutter head 11 is plotted in abscissas, and the corresponding strain of the cutter columns 12 is plotted in ordinates. Since the cutter thrust force and the strain of the cutter columns 12 are related linearly, the force (the cutter thrust force) acting on the cutter head 11 can be calculated with a sufficient accuracy based on the strain measurements of the cutter columns 12.

FIG. 11 is a radar chart of the strain measurements shown in FIG. 9, in which the strain of the cutter columns 12 is plotted in association with the rotational angle θ (ranging from 0° to 359° for one rotation) calculated by Formula (2) above. As described above, the radial direction indicates the magnitude of the strain. As the plotted point is closer to the center, the strain (the force acting on the cutter head 11) is smaller, and as the plotted point is more distant from the center, the strain is larger. As the locus for one rotation of the cutter head 11 approximates a precise circle centered at the center of the chart, the cutter head 11 is subjected to loads distributed more uniformly, and as the locus is deformed from the precise circle, a larger eccentric load is acting on the cutter head 11.

In FIG. 11, the locus is expanded in the radial direction as the thrust force is increased between the three levels, and the upper right portion of the locus is projected radially outward. This result indicates that there is an eccentric load that imparts a larger force to an upper right portion of the cutter head 11.

As described above, according to the first embodiment, it was confirmed that the rotational direction distribution F(θ) of the forces acting on the cutter head 11 in the direction of the rotation axis can be obtained from the strain measurements of the cutter columns 12. In addition, according to the first embodiment, it was confirmed that it can be determined whether the cutter head 11 is subjected to an eccentric load and what portion of the cutter head 11 is subjected to the eccentric load based on whether the distribution F(θ) or the forces acting on the cutter head 11 is deformed from the precise circle.

Second Embodiment

Next, the tunnel boring machine according to a second embodiment of the present invention will now be described with reference to FIGS. 12A and 12B. Unlike the first embodiment which is the tunnel boring machine 1 having the intermediate support structure in which strain of the cutter columns 12 is measured, the second embodiment is a tunnel boring machine 1a having a center shaft support structure in which strain of a center shaft 112 is measured. In the following description of the second embodiment, the same elements as in the first embodiment will be denoted by the same reference numerals and descriptions thereof will be omitted.

In the second embodiment, as shown in FIGS. 12A and 12B, the tunnel boring machine 1a may have a small to medium diameter and adopt the center shaft support structure for supporting the cutter head 111. In the center shaft support structure, the cutter head 111 may be mounted to the center shaft 112 centered at the rotation axis A. The tunnel boring machine 1a according to the second embodiment may include no cutter columns. The center shaft 112 is an example of "a cutter support" of the present invention.

The center shaft 112 may be constituted by a shaft having a hollow cylindrical shape and configured to support the cutter head 111 and rotate along with the cutter head 111. The center shaft 112 may have the front (the direction X1) end thereof mounted to the central portion 11c of the cutter head 111 and the rear (the direction X2) end thereof rotatably supported by the bearing 17 provided on the bulkhead 16 of the front trunk 15. When the center shaft 112 is rotationally driven by the cutter driving unit 14 around the rotation axis A (the central axis), the cutter head 111 and the center shaft 112 may be rotated integrally. The rotational angle of the center shaft 112 may be sensed by the encoder 20.

In the second embodiment, the strain sensors 22 may be provided on an inner circumferential surface of the center shaft 112. As in the first embodiment, a plurality of strain sensors 22 may be provided at regular angular intervals such as 90° that divide 360° equally (see FIG. 12B). It is supposed herein that four strain sensors 22 are provided in the center shaft 112 at intervals of 90°. The strain sensors 22 may be mounted to an installation surface (an inner circumferential surface) 113 of the center shaft 112, the installation surface 113 extending substantially in parallel with the direction of the rotation axis (the direction X). The strain sensors 22 provided at any rotational position on the cylindrical inner surface of the center shaft 112 may be substantially parallel with the rotation axis.

The relay box 26 may be positioned in the center shaft 112 along with the strain sensors 22. The relay box 26 may output temperature measurements of the strain sensors 22 and the temperature sensors (not shown) to the data processing device (the data processing unit) via the rotary joint 27 provided on the rear end of the center shaft 112.

The data processing device 123 may calculate, from the strain measurements of the four strain sensors 22 in the center shaft 112, the cutter thrust force F and the rotational direction distribution F(θ) of the forces acting on the cutter head 11 in the direction of the rotation axis (the direction X). The cutter thrust force F and the force F(θ) in association with the rotational angle θ may be calculated in the same manner as in the first embodiment.

With this arrangement of the second embodiment having the center shaft support structure, the rotational direction distribution F(θ) of the forces acting on the cutter head 111 in the direction of the rotation axis (the direction X) can be obtained based on the strain of the center shaft 112. Other configuration of the second embodiment is the same as that of the first embodiment described above.

The second embodiment provides the following advantageous effects.

In the second embodiment, the strain sensors 22 may be provided in the center shaft 112, so as to sense directly and accurately the force actually acting on the cutter head 111, as in the first embodiment. In addition, the data processing device 123 may obtain from the strain sensors 22 the force acting on the cutter head 111 as the rotational direction distribution over one rotation (360°) of the cutter head 111. With these arrangements, the tunnel boring machine 1a of the second embodiment can accurately sense the distribution F(θ) of the forces acting on the cutter head 111, as in the first embodiment described above.

According to the second embodiment, in the tunnel boring machine 1a having the center shaft support structure, not the intermediate support structure including cutter columns, strain sensors 22 may be provided in the center shaft 112, so as to accurately sense the distribution F(θ) of the force acting on the cutter head 111.

Variation of Second Embodiment

In the second embodiment, the tunnel boring machine 1a having the center shaft support structure may include the strain sensors 22 in the center shaft 112. In a variation of the second embodiment, the strain sensors 22 may be provided on portions other than the center shaft 112.

Figure 13A:
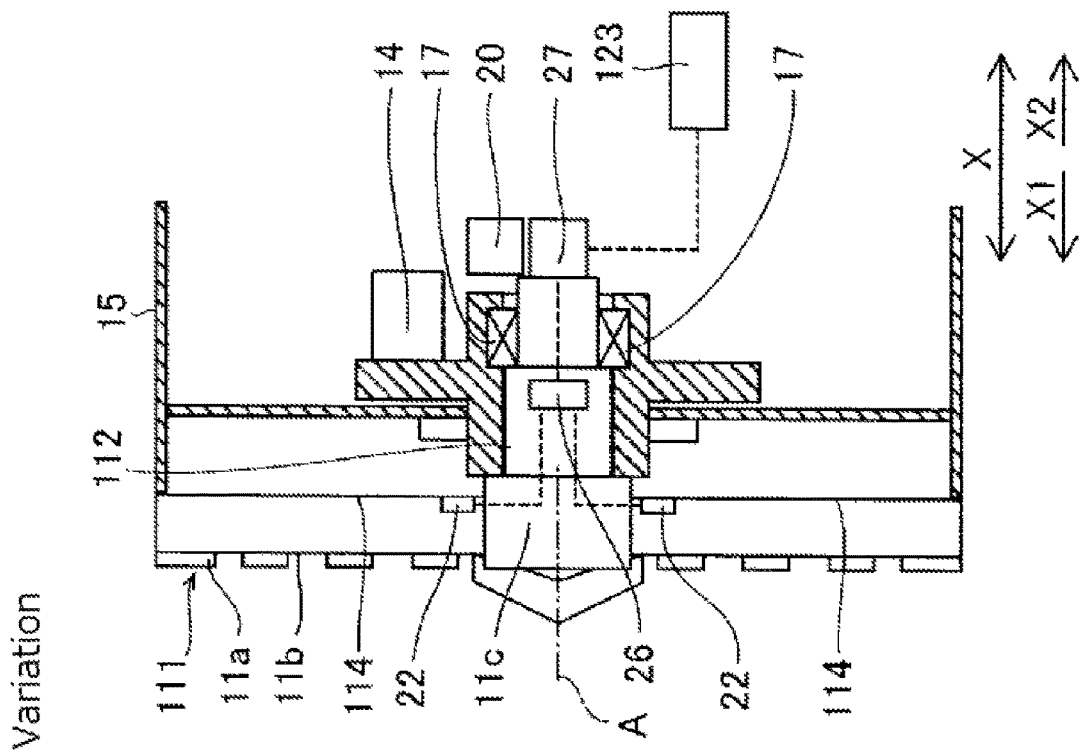
FIG. 13A is a schematic longitudinal sectional view of a tunnel boring machine according to a variation of the second embodiment.
Figure 13B:
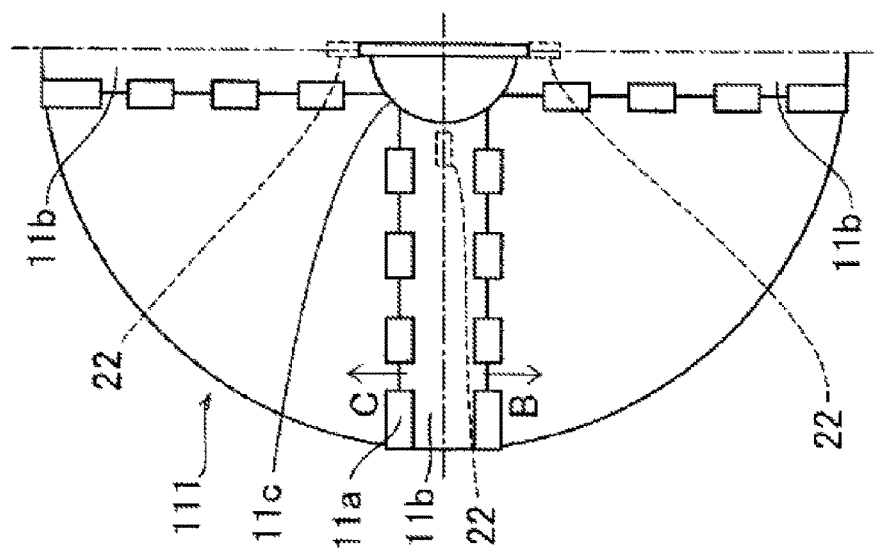
FIG. 13B is a schematic front view of a part of the tunnel boring machine shown in FIG. 13A.

As shown in FIGS. 13A and 13B, in the variation of the second embodiment, the strain sensors 22 may be provided in the spokes 11b of the cutter head 111. The spokes 11b may have a hollow and rectangular tube shape, and the strain sensors 22 may be provided in the installation surfaces 114 that are inner surfaces of the spokes 11b facing in the direction of the rotation axis (the direction X). Accordingly, the strain sensors 22 may measure the bending strain of the spokes 11b in the direction X2 produced by the reaction against the force (the thrust force) acting on the cutter head 111 in the direction of the rotation axis (the direction X1). In FIG. 13A, the strain sensors 22 may be provided in the inner surface (the installation surface 114) of the spokes 11b facing in the direction X2. It may be preferable that additional strain sensors 22 are provided in the inner surface facing in the direction X1 opposed to the inner surface facing in the direction X2, as in the first embodiment described above.

The strain sensors 22 may be provided in the spokes 11b extending radially from the central portion 11c of the cutter head 111, and more specifically, in the base portions thereof near the central portion 11c. This is because the bending strain applied to the spokes 11b is larger in the base portions near the central portion 11c.

In FIG. 13B, the cutter head 111 may include four spokes 11b (FIG. 13B shows only three spokes 11b), and each of the four spokes 11b may be provided with a strain sensor 22.

The data processing device 123 may calculate, from the strain measurements of the strain sensors 22 in the four spokes 11b, the cutter thrust force F and the rotational direction distribution F(θ) of the forces acting on the cutter head 11 in the direction of the rotation axis (the direction X).

As in the variation of the second embodiment, the tunnel boring machine 1a having the center shaft support structure may include the strain sensors 22 in the spokes 11b instead of the center shaft 112, so as to calculate the force acting on the cutter head 11 in the rotation axis (the direction X). It may also be possible to combine the second embodiment and the variation thereof. In this combination, the strain sensors 22 may be provided in both the center shaft 112 and the spokes 11b, and the force acting on the cutter head 11 can be calculated from the strain measurements obtained from these strain sensors 22.

Third Embodiment

Next, the tunnel boring machine according to a third embodiment of the present invention will now be described with reference to FIGS. 14A and 14B. Unlike the first and second embodiments in which the force acting on the cutter head 111 in the direction of the rotation axis (the direction X), the third embodiment is configured such that the force acting on the cutter head 111 in the rotational direction (the direction B or the direction C). In the following description of the third embodiment, the same elements as in the second embodiment will be denoted by the same reference numerals and descriptions thereof will be omitted.

As shown in FIGS. 14A and 14B, the tunnel boring machine 1b according to the third embodiment may have the center shaft support structure which is the same as that of the second embodiment. In the third embodiment, the strain sensors 22 may be provided at different locations than in the second embodiment.

In the third embodiment, the strain sensors 22 may be provided in installation surfaces 213 of the spokes 11b of the cutter head 111, the installation surfaces 213 being substantially parallel to the rotation axis A. The installation surfaces 213 may be inner surfaces of the spokes 11b of the cutter head 111 facing in the circumferential direction (the rotational direction). In other words, the strain sensors 22 may be provided in the inner surfaces of the spokes 11b facing in the direction B and the inner surfaces of the spokes 11b facing in the direction C. Accordingly, the strain sensors 22 may measure the bending strain of the spokes 11b in the direction B or C produced by the reaction against the force (the rotational torque of the cutter driving unit 14) acting on the cutter head 111 in the rotational direction (the direction B or C).

The strain sensors 22 may be provided in the spokes 11b extending radially from the central portion 11c of the cutter head 111, and more specifically, in the base portions thereof near the central portion 11c. In FIG. 14B, the cutter head 111 may include four spokes 11b (FIG. 14B shows only three spokes 11b), and each of the four spokes 11b may be provided with a strain sensor 22. The four spokes 11b may be arranged at regular angular intervals of 90° so as to intersect each other perpendicularly. Therefore, the strain sensors 22 may be provided at four locations at regular angular intervals of 90° so as to divide 360° into four parts (90°).

The data processing device (the data processing unit) 223 may calculate, from the strain measurements of the strain sensors 22 in the four spokes 11b, the rotational direction distribution of the forces acting on the cutter head 111. That is, in the third embodiment, the data processing device 223 may be configured to obtain the rotational direction distribution of the forces acting on the spokes 11b in the rotational direction (the direction B or C).

Other configuration of the third embodiment is the same as that of the second embodiment described above.

The third embodiment provides the following advantageous effects.

In the third embodiment, the strain sensors 22 may be provided in the installation surfaces 213 of the spokes substantially parallel to the rotation axis A, so as to sense directly and accurately the force actually acting on the cutter head 111, as in the first embodiment. In addition, the data processing device 223 may obtain from the strain sensors 22 the force acting on the cutter head 111 (the spokes 11b) as the rotational direction distribution over one rotation (360°) of the cutter head 111. With these arrangements, the tunnel boring machine 1b of the third embodiment can accurately sense the distribution of the forces acting on the cutter head 111, as in the first embodiment described above.

In the third embodiment, the data processing device 223 may be configured to obtain the rotational direction distribution of the forces acting on the spokes 11b in the rotational direction (the direction B or C) based on the sensing results of the strain sensors 22 and the encoder 20, as described above. Thus, it may be possible to obtain the distribution of the forces acting on the spokes 11b of the cutter head 111 in the rotational direction, the forces being produced as reaction forces against the rotational torque of the cutter driving unit 14. As a result, it may be possible to grasp whether an eccentric load is present in the distribution of the forces in the rotational direction and where the eccentric load is present. Therefore, it may be possible to grasp a sudden change of strata in front of the tunnel boring machine boring forward or an encounter with a buried object, and further, it may be possible to grasp the location of the change of strata and the position of the buried object relative to a boring surface.

More specifically, suppose that, for example, at a point of time in boring, the upper spokes 11b in FIG. 14A are excavating a relatively soft stratum, while the lower spokes 11b are excavating a relatively hard stratum or encountering stones. In this case, when the cutter driving unit 14 rotates the cutter head 111 around the rotation axis A, the strain of the lower spokes 11b in the rotational direction may be larger than the strain of the upper spokes 11b in the rotational direction, indicating that the lower spokes 11b are subjected to an eccentric load. Thus, the distribution of the forces acting on the spokes 11b of the cutter head 111 in the rotational direction may be obtained to determine from the obtained distribution of the forces whether the cutter head 111 is subjected to an eccentric load. As a result, it may be possible to grasp a change of strata or the presence of a buried object early and prevent damage to the cutter head 111 and wear of the cutter bits caused thereby.

Other advantageous effects of the third embodiment are the same as that of the first embodiment described above.

The embodiments and the variations disclosed above are mere examples in all respects, and the invention is not limited to these embodiments and variations. The scope of the invention will be defined by the appended claims not by the above-described embodiments. It is intended to cover modifications (variations) and equivalent arrangements that are within the spirit and scope of the appended claims.

For example, the first embodiment is an example of a tunnel boring machine having the intermediate support structure and the second embodiment is an example of a tunnel boring machine having the center shaft support structure. The present invention is not limited to these embodiments. The tunnel boring machine of the present invention can be applied to tunnel boring machines having other various support structures such as outer circumference support structure, center support structure, and eccentric multiaxial support structure.

In the first embodiment, strain is measured by the 4-Gage system in which four strain sensors 22 are provided at each location. The present invention is not limited to this system. It may also be possible to measure the strain by measurement systems other than 4-Gage system, for example, 1-Gage system, 2-Gage system, etc. Further, it may also be possible to use strain sensors having two or more sensing axes (strain sensors including a plurality of elements), instead of those having a single axis.

In the first embodiment, the encoder 20 may sense the rotational angle of the rotation base 13, and in the second and the third embodiments, the encoder 20 may sense the rotational angle of the center shaft 112. The present invention is not limited to these arrangements. In the present invention, it may also be possible that the encoder senses the rotational angle of the output shaft of the cutter driving unit. The encoder may sense the rotational angle of any portion of the tunnel boring machine as long as it is possible to sense the rotational angle of the cutter head.

In the first embodiment, the temperature sensor 25 may be provided near the strain sensors 22 to perform temperature compensation of the measurements of the strain sensors 22. The present invention is not limited to this arrangement. In the present invention, use of the temperature sensor is optional. In particular, when the range of temperature variation in the installation surface of the strain sensors lies within the service temperature range of the strain sensors, there is no need of temperature compensation.

LIST OF REFERENCE NUMBERS

1, 1a, 1b tunnel boring machine
11, 111 cutter head
11b spokes
12 cutter column (cutter support)
14 cutter driving unit
20 rotary encoder (rotational position sensing unit)
22 strain sensors
23, 123, 223 data processing device (data processing unit)
25 temperature sensor
12a, 113, 114 installation surfaces
112 center shaft (cutter support)
213 installation surfaces
A rotation axis
B, C rotational direction
X direction of rotation axis

What is claimed is:
1. A tunnel boring machine having an intermediate support structure, comprising:
  a chamber;
  a cutter head;
  a cutter column, which is a cutter support supporting the cutter head and configured to rotate with the cutter head;
  a cutter driving unit configured to rotationally drive the cutter head and the cutter support;
  a rotational position sensing unit configured to sense a position of the cutter head in a rotational direction;
  at least one strain sensor provided in the cutter column; and
  a data processing unit configured to calculate a force acting on the cutter head in association with the position of the cutter head in the rotational direction, based on sensing results of the at least one strain sensor and the rotational position sensing unit,
  wherein the cutter column is configured to move in a circumferential direction in the chamber, the cutter column has a rectangular tube shape and includes a pair of side surfaces facing the circumferential direction, and
  the at least one strain sensor is mounted to each of a pair of installation surfaces, using inner surfaces of the pair of side surfaces facing the circumferential direction as the pair of installation surfaces.
2. The tunnel boring machine of claim 1, wherein the data processing unit is configured to calculate rotational direction distribution of forces acting on the cutter head in a direction of a rotation axis, based on sensing results of the at least one strain sensor and the rotational position sensing unit.

3. The tunnel boring machine of claim 1, wherein the at least one strain sensor comprises three or more strain sensors arranged at regular angular intervals.

4. The tunnel boring machine of claim 1, further comprising a temperature sensor provided near the at least one strain sensor,
wherein the data processing unit is configured to perform temperature compensation on the sensing results of the at least one strain sensor, based on a temperatures near the at least one strain sensor sensed by the temperature sensor.

5. A tunnel boring machine having an intermediate support structure, comprising:
a chamber;
a cutter head;
a cutter column, which is a cutter support supporting the cutter head and configured to rotate with the cutter head;
a cutter driving unit configured to rotationally drive the cutter head and the cutter support;
a rotational position sensing unit configured to sense a position of the cutter head in a rotational direction;
at least one strain sensor provided in the cutter column; and
a data processing unit configured to calculate a force acting on the cutter head in association with the position of the cutter head in the rotational direction, based on sensing results of the at least one strain sensor and the rotational position sensing unit,
wherein the cutter column configured to move in a circumferential direction in the chamber has a hollow tubular shape, the cutter column having a pair of side surfaces facing the circumferential direction; and
wherein the at least one strain sensor is mounted to each of inner surfaces of the pair of side surfaces.

6. The tunnel boring machine of claim 5, wherein the data processing unit is configured to calculate rotational direction distribution of forces acting on the cutter head in a direction of a rotation axis, based on sensing results of the at least one strain sensor and the rotational position sensing unit.

7. The tunnel boring machine of claim 5, wherein the at least one strain sensor comprises three or more strain sensors arranged at regular angular intervals.

8. The tunnel boring machine of claim 5, further comprising a temperature sensor provided near the at least one strain sensor,
wherein the data processing unit is configured to perform temperature compensation on the sensing results of the at least one strain sensor, based on a temperatures near the at least one strain sensor sensed by the temperature sensor.

9. A tunnel boring machine having an intermediate support structure, comprising:
a cutter head;
a cutter column, which is a cutter support supporting the cutter head and configured to rotate with the cutter head;
a cutter driving unit configured to rotationally drive the cutter head and the cutter support;
a rotational position sensing unit configured to sense a position of the cutter head in a rotational direction;
at least one strain sensor provided in the cutter column;
a data processing unit configured to calculate a force acting on the cutter head in association with the position of the cutter head in the rotational direction, based on sensing results of the at least one strain sensor and the rotational position sensing unit; and
a plurality of cutter columns arranged at a distance in radial directions from a rotation axis at regular angular intervals.

10. The tunnel boring machine of claim 9, wherein the data processing unit is configured to calculate rotational direction distribution of forces acting on the cutter head in a direction of a rotation axis, based on sensing results of the at least one strain sensor and the rotational position sensing unit.

11. The tunnel boring machine of claim 9, wherein the at least one strain sensor comprises three or more strain sensors arranged at regular angular intervals.

12. The tunnel boring machine of claim 9, further comprising a temperature sensor provided near the at least one strain sensor,
wherein the data processing unit is configured to perform temperature compensation on the sensing results of the at least one strain sensor, based on a temperatures near the at least one strain sensor sensed by the temperature sensor.

13. A tunnel boring machine comprising:
a cutter head;
a cutter support supporting the cutter head and configured to rotate with the cutter head;
a cutter driving unit configured to rotationally drive the cutter head and the cutter support;
a rotational position sensing unit configured to sense a position of the cutter head in a rotational direction;
at least one strain sensor provided in a cutter spoke itself of the cutter head; and
a data processing unit configured to calculate a force acting on the cutter head in association with the position of the cutter head in the rotational direction, based on sensing results of the at least one strain sensor and the rotational position sensing unit,
wherein the cutter head has the cutter spoke and a plurality of cutter bits, and
wherein the at least one strain sensor is provided in the cutter spoke at a position apart from the plurality of cutter bits in a direction of a rotation axis of the cutter head.

14. The tunnel boring machine of claim 13, wherein the data processing unit is configured to calculate rotational direction distribution of forces acting on the cutter head in a direction of a rotation axis, based on sensing results of the at least one strain sensor and the rotational position sensing unit.

15. The tunnel boring machine of claim 13, wherein the at least one strain sensor comprises three or more strain sensors arranged at regular angular intervals.

16. The tunnel boring machine of claim 13, further comprising a temperature sensor provided near the at least one strain sensor,
wherein the data processing unit is configured to perform temperature compensation on the sensing results of the at least one strain sensor, based on a temperatures near the at least one strain sensor sensed by the temperature sensor.

* * * * *